US011957980B2

United States Patent
Pineda

(10) Patent No.: US 11,957,980 B2
(45) Date of Patent: Apr. 16, 2024

(54) RESPAWN SYSTEMS AND METHODS IN VIDEO GAMES

(71) Applicant: Electronic Arts Inc., Redwood City, CA (US)

(72) Inventor: Carlos Emmanuel Reyes Pineda, Sherman Oaks, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 18/146,111

(22) Filed: Dec. 23, 2022

(65) Prior Publication Data

US 2023/0201720 A1  Jun. 29, 2023

Related U.S. Application Data

(63) Continuation of application No. 17/322,597, filed on May 17, 2021, now Pat. No. 11,541,312, which is a continuation of application No. 16/528,377, filed on Jul. 31, 2019, now Pat. No. 11,007,439.

(51) Int. Cl.
*A63F 13/58* (2014.01)
*A63F 13/837* (2014.01)
*A63F 13/5378* (2014.01)

(52) U.S. Cl.
CPC .......... *A63F 13/58* (2014.09); *A63F 13/837* (2014.09); *A63F 13/5378* (2014.09)

(58) Field of Classification Search
CPC ..... A63F 13/58; A63F 13/837; A63F 13/5378
See application file for complete search history.

(56) References Cited

U.S. PATENT DOCUMENTS

| | | | |
|---|---|---|---|
| 9,511,280 B1 | 12/2016 | Hawk et al. | |
| 11,007,439 B1 | 5/2021 | Pineda | |
| 11,541,312 B2 | 1/2023 | Pineda | |
| 2004/0143852 A1 | 7/2004 | Meyers | |
| 2005/0143174 A1 | 6/2005 | Goldman et al. | |
| 2007/0087835 A1* | 4/2007 | Van Luchene | A63F 13/58 463/43 |
| 2007/0219001 A1 | 9/2007 | Mueller et al. | |
| 2008/0090628 A1 | 4/2008 | Mueller et al. | |
| 2009/0089157 A1 | 4/2009 | Narayanan | |
| 2011/0077078 A1 | 3/2011 | Taoka et al. | |
| 2012/0214562 A1* | 8/2012 | Im | A63F 13/48 463/2 |
| 2015/0174487 A1* | 6/2015 | Tabata | A63F 13/48 463/42 |
| 2017/0326451 A1* | 11/2017 | Maejima | A63F 13/847 |

FOREIGN PATENT DOCUMENTS

WO   WO 2016/088951 A1   6/2016

* cited by examiner

*Primary Examiner* — David L Lewis
*Assistant Examiner* — Shauna-Kay Hall
(74) *Attorney, Agent, or Firm* — Knobbe Martens Olson & Bear LLP

(57) ABSTRACT

In a video game, a player's character can start in a normal state, receive first damage, and change to an incapacitated state. The player's character can be revived from the incapacitated state back to the normal state. The player's character can be changed from the incapacitated state to a preliminarily defeated state, and in response, a player respawn activation item can be generated. The player respawn activation item can be used by the player's teammates to respawn the player's character at one or more respawn locations.

20 Claims, 23 Drawing Sheets

RESPAWN SYSTEMS AND METHODS IN VIDEO GAMES

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

FIELD

This application relates generally to video games. Some aspects relate more particularly to respawn systems and methods in video games.

BACKGROUND

Team-based multiplayer games are becoming increasingly popular. In many games, team members whose characters are eliminated must wait for a new round in order to resume play. Players controlling eliminated characters have few reasons to remain engaged in the game, and those players often leave their games to start a new round.

SUMMARY OF CERTAIN EXAMPLES

Some aspects feature a method, implemented by one or more processors, comprising: executing a multiplayer gameplay session of a video game application where multiple players control in-game characters interacting within a virtual environment; changing a first character from a normal state to a preliminarily defeated state at a first location in the virtual environment, wherein the first character is controlled by first user inputs provided by a first player on a first team; generating a respawn activation item for the first character; receiving second user inputs from a second player on the first team controlling a second character to acquire the respawn activation item; receiving third user inputs causing a member of the first team to use the respawn activation item at a respawn location different from the first location; and in response to using the respawn activation item at the respawn location, respawning the first character at the respawn location in the normal state.

The method can feature one, some, all, or any combination of the following. The method further includes restricting the first character to an incapacitated state before the first character is preliminarily defeated. While the first character is in the incapacitated state, the first character is restricted from at least one of: using an inventory item otherwise available to the first character while the first character is in the normal state or performing an action or movement otherwise available to the first character while the first character is in the normal state. The method further includes changing the first character from the incapacitated state to be preliminarily defeated based at least in part in response to at least one of: the first character remaining in the incapacitated state for a threshold quantity of elapsed time without recovering to the normal state or the first character receiving damage. The third user inputs are received from a third player on the first team. The method further includes: in response to the preliminary defeat of the first character, generating an inventory container for the first character, wherein the inventory container includes inventory items of the first character; and receiving fourth user inputs from the second player controlling the second character to interact with the inventory container to acquire one or more of the inventory items. The second user inputs from the second player control the second character to interact with the inventory container to acquire the respawn activation item. The first character is respawned at the respawn location without inventory items. The method further includes starting an elimination timer in response to the first character being preliminarily defeated, wherein an elimination of the first character is determined based at least in part on the elimination timer.

Some aspects feature a non-transitory, computer readable medium storing computer-executable instructions configured to be executed by one or more processors to perform operations comprising: executing video game engine of a multiplayer video game where in-game characters interact in a virtual environment; changing a first character to a preliminarily defeated state at a first location in the virtual environment, wherein the first character is controlled by first user inputs provided by a first player on a first team; generating a respawn activation item for the first character; receiving second user inputs from a second player on the first team controlling a second character to acquire the respawn activation item; receiving third user inputs from any member of the first team causing any character to use the respawn activation item at a respawn location different from the first location; and in response to using the respawn activation item at the respawn location, respawning the first character at the respawn location.

The non-transitory, computer readable medium storing computer-executable instructions can include one, some, all, or any combination of the following. The operations further include restricting the first character to an incapacitated state before the first character is preliminarily defeated, wherein while the first character is in the incapacitated state, the first character is restricted from at least one of: using an inventory item otherwise available to the first character while the first character is in the normal state, or performing an action or movement otherwise available to the first character while the first character is in the normal state. The operations further include changing the first character from the incapacitated state to be preliminarily defeated based at least in part in response to at least one of: the first character remaining in the incapacitated state for a threshold quantity of elapsed time without recovering to the normal state, or the first character receiving damage. The third user inputs are received from a third player on the first team. The operations further include: in response to the preliminary defeat of the first character, generating an inventory container for the first character, wherein the inventory container includes inventory items of the first character; and receiving fourth user inputs from the second player controlling the second character to interact with the inventory container to acquire one or more of the inventory items. The second user inputs from the second player on the first team control the second character to interact with the inventory container to acquire the respawn activation item. The first character is respawned at the respawn location without inventory items. The operations further include starting an elimination timer in response to the first character being preliminarily defeated, wherein an elimination of the first character is determined based at least in part on the elimination timer.

Some aspects feature a computer system comprising: one or more data stores storing computer-executable instructions, and one or more processors configured to execute the computer executable instructions in order to perform operations. The operations include: executing video game engine of a multiplayer video game where in-game characters interact in a virtual environment; changing a first character to a preliminarily defeated state at a first location in the virtual environment, wherein the first character is controlled by first user inputs provided by a first player on a first team; generating a respawn activation item for the first character; receiving second user inputs from a second player on the first team controlling a second character to acquire the respawn activation item; receiving third user inputs from any member of the first team causing any character to use the respawn activation item at a respawn location different from the first location; and in response to using the respawn activation item at the respawn location, respawning the first character at the respawn location.

The computer system can include one, some, all, or any combination of the following. The operations further include restricting the first character to an incapacitated state before the first character is preliminarily defeated. While the first character is in the incapacitated state, the first character is restricted from at least one of: using an inventory item otherwise available to the first character while the first character is in the normal state, or performing an action or movement otherwise available to the first character while the first character is in the normal state. The operations further include changing the first character from the incapacitated state to be preliminarily defeated based at least in part in response to at least one of: the first character remaining in the incapacitated state for a threshold quantity of elapsed time without recovering to the normal state, or the first character receiving damage. The third user inputs are received from a third player on the first team. The operations further include: in response to the preliminary defeat of the first character, generating an inventory container for the first character, wherein the inventory container includes inventory items of the first character; and receiving fourth user inputs from the second player controlling the second character to interact with the inventory container to acquire one or more of the inventory items. The second user inputs from the second player control the second character to interact with the inventory container to acquire the respawn activation item. The first character is respawned at the respawn location without inventory items.

DETAILED DESCRIPTION

Introduction

Figure 1:
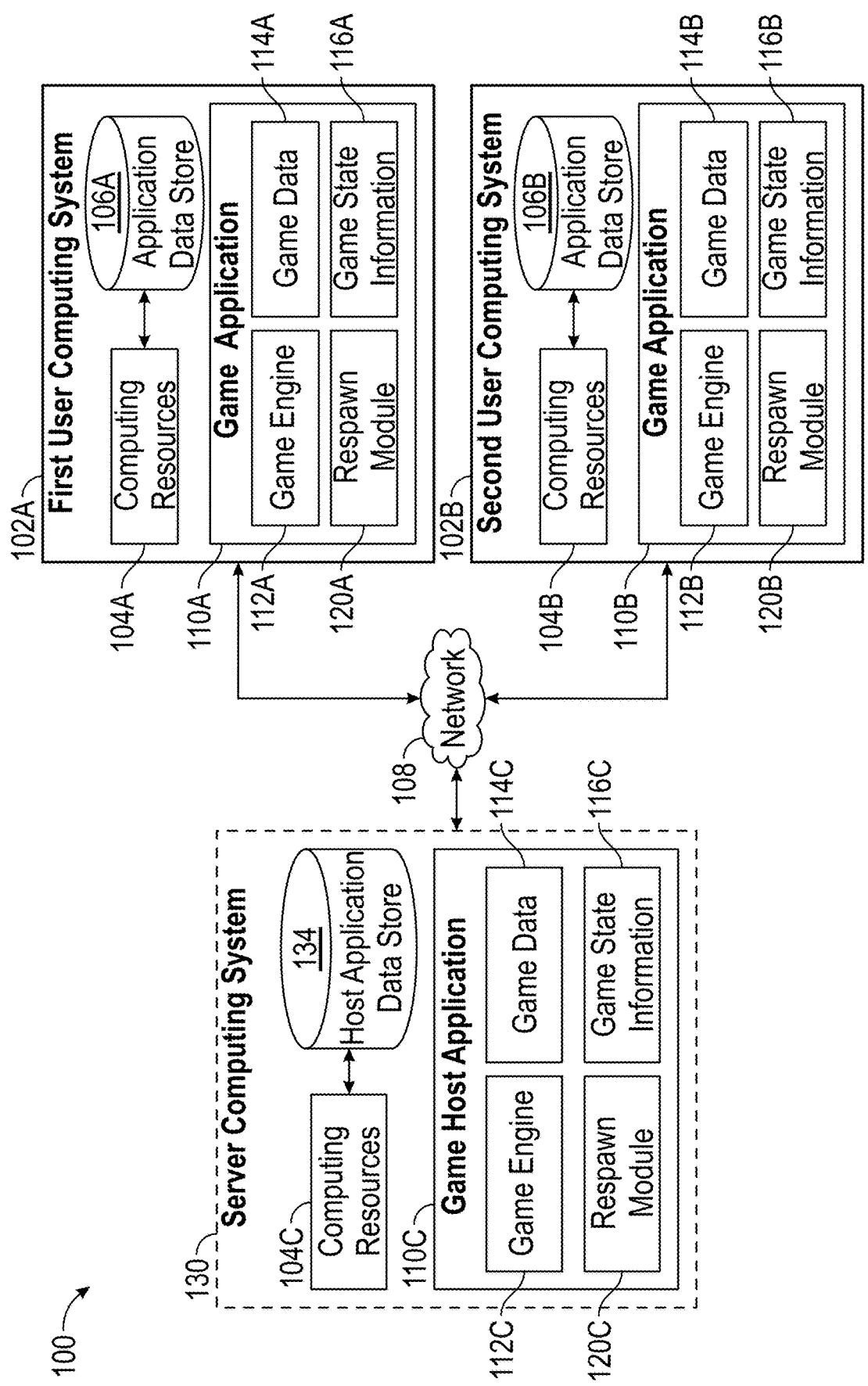
FIG. 1 illustrates an example of a multiplayer video game computing environment for respawning video game characters.

Team-based multiplayer video games have suffered from a long felt but unsolved need for improved gameplay mechanics to encourage team play. In some video games, individual teammates lack sufficient incentives to stay with a team and instead act individually. An individual teammate eliminated from gameplay during a team-based multiplayer video game often prefers to leave the game instance and start a new instance of the video game to more quickly participate in active gameplay again. Such an individual teammate rarely stays engaged enough to watch their teammates continue to play after elimination. Other teammates may be discouraged when a team member is eliminated, as such an elimination can disrupt a carefully selected team composition put the team at an uncompetitive disadvantage for the remainder of the game. In some games, a player's defeated character can be respawned automatically after a time period and/or by using an extra life. Such automatic respawn systems do not provide players with the satisfaction of more permanently defeating opponents.

Players of many team-based multiplayer games stand to benefit from improved defeat mechanics and improved post-defeat gameplay. Certain features can be implemented to encourage defeated teammates to remain in a game instance. For example, various revival systems can be implemented. Some video games can allow teammates to revive characters that have been "knocked down" or otherwise partially incapacitated before the character is defeated or eliminated from a game. One or more restrictions on movement, item use, and/or ability use can be imposed on a character in a partially incapacitated state. In some implementations, a threshold period of time can limit when a partially incapacitated character can be revived. After the threshold period of time and/or taking additional damage, the character can change to an eliminated state. Changing a character from a normal state to an incapacitated state before the character is changed to the defeated state allows for a chance of revival by other teammates. Accordingly, players are encouraged to stay close to their teammates to improve the ease and chances of revival, thereby also encouraging other aspects of teamwork.

As an additional or alternative mechanic to encourage team play and to stay in a game, a revival system can be followed by a respawn system. The respawn system disclosed herein can create an additional chance for defeated players to be respawned by their teammates. The respawn system can generate a respawn activation item based at least in part in response to a preliminary defeat of a first player. The preliminary defeat of the first player can cause inventory items held by the first player at the time of defeat to be made available for other nearby players to acquire. Accordingly, the first player's teammates are encouraged to stay close to the first player to facilitate item acquisition in case the first player is preliminarily defeated. Any member of the first player's team can pick up the respawn activation item. Any team member can use the respawn activation item at a respawn location to respawn the first player's character. The team member who uses the respawn activation item can be the team member who picked up the respawn activation item. The team member who uses the respawn activation item can alternatively be a different team member who did not pick up the respawn activation item. The first player's character can respawn with no items.

Various examples of defeat and respawn systems disclosed herein can feature one, some, or all of the following aspects. Players are encouraged to stay close together and work as a team. Players can pick characters with particular roles such as tanks, glass cannons, healers, support, and the like knowing that if any character is preliminarily defeated, then the preliminarily defeated character can be revived to rebalance the team composition. Players can be rewarded by at least a guaranteed preliminary defeat of opponents when dealing sufficient damage.

A limited description of the respawn system is provided here in the introduction. Additional details and examples of a respawn system are disclosed below and with respect to the drawings.

Definitions

"Player" refers to real-world users (e.g., people) playing a video game as opposed to characters that fictitiously exist in the video game.

"Character" refers to an entity fictitiously existing in a video game as opposed to real-world users, people, or players.

Overview of Multiplayer Video Game Computing Environment

FIG. 1 illustrates an example of a multiplayer video game computing environment 100 for respawning video game characters. The environment 100 includes a network 108, a plurality of user computing systems 102A, 102B, and a server computing system 130. The user computing systems 102A, 102B respectively have computing resources 104A, 104B and application data stores 106A, 106B. The user computing systems 102A, 102B are configured to respectively execute game applications 110A, 110B that include game engines 112A, 112B, game data 114A, 114B, game state information 116A, 116B, and respawn modules 120A, 120B. The server computing system 130 has computing resources 104C and host application data store 134. The server computing system 130 is configured to execute a game host application 110C that includes a game engine 112C, game data 114C, game state information 116C, and a respawn module 120C. The user computing systems 102A, 102B may communicate via a network 108 with each other and additionally or alternatively with the server computing system 130.

FIG. 1 includes two user computing systems 102A, 102B and one server computing system 130. However, the technology disclosed herein can be used with any other greater quantity of user computing systems. The technology disclosed herein can also be implemented using any greater quantity of server computing systems. In some examples, one or more of the user computing systems 102A, 102B can perform the server functions and directly communicate with each other, and the server computing system 130 can be optionally omitted. In some examples, computer functions can be distributed between the server computing system 130 and the user computing systems 102A, 102B. Although only one network 108 is illustrated, multiple distinct and/or distributed networks 108 may exist.

Computing Systems

The computing systems 102A, 102B include respective computing resources 104A, 104B and application data stores 106A, 106B. The user computing systems 102A, 102B may have varied local computing resources 104A, 104B such as central processing units and architectures, memory, mass storage, graphics processing units, communication network availability and bandwidth, and so forth. The application data stores 106A, 106B can store non-transitory, computer-readable instructions for the local computing resources 104A, 104B to execute. Further, the user computing systems 102A, 102B may include any type of computing system, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, PDAs, tablets, or the like), to name a few.

The user computing systems 102A, 102B can use the computing resources 104A, 104B to execute the game applications 110A, 110B. The user computing systems 102A, 102B receive user inputs from respective players to be executed by the game applications 110A, 110B and/or the server computer system 130, and the user computing systems 102A, 102B generate video outputs displaying the responses and progression of the video game. A more detailed description of an example of a computing system is described below with respect to FIG. 15.

The server computing system 130 includes computing resources 104C and host application data store 134. The server computing system 130 may have varied local computing resources 104C, such as central processing units and architectures, memory, mass storage, graphics processing units, communication network availability and bandwidth, and so forth. The host application data store 134 can store non-transitory, computer-readable instructions for the computing resources 104C to execute. Further, the server computing system 130 may include any type of computing system.

The server computing system 130 can use the computing resources 104C to execute the game host application 110C, which can be the same as or different from the game applications 110A, 110B. In some examples, the game host application 110C can be executed by one or more computing devices, such as servers and databases that may host and/or execute portions of one or more instances of the game applications 110A, 110B. A more detailed description of an example of a computing system is described below with respect to FIG. 15.

Unless otherwise specified, "one or more data stores" can refer to any one of the data stores 106A, 106B, 134 or any combination of the data stores 106A, 106B, 134 from user computing systems and/or server computing systems. Unless otherwise specified, "one or more processors" can refer to one or more processors from any one of the computing resources 104A, 104B, 104C or any combination of the computing resources 104A, 104B, 104C from user computing systems and/or server computing systems.

Game Host Application

The server computing system 130 may enable multiple users or computing systems to access a portion of the game host application 110C executed or hosted by the server computing system 130. The server computing system 130 can include a respawn module 120C. In some examples, the game host application 110C may execute a hosting system for executing various aspects of a game environment. For example, the game host application 110C can record the location of characters and other units within the game environment. The game host application 110C may be a multiplayer game in which the server computing system 130 provides additional functionality when connected to the instance of the game applications 110A, 110B. In some examples, the game host application 110C can provide a dedicated hosting service for hosting multiplayer game instances or facilitate the creation of game instances hosted by user computing devices 102A, 102B. In some examples, the game host application 110C can provide a lobby or other environment for users to virtually interact with one another.

Game Application

The user computing systems 102A, 102B can execute respective game applications 110A, 110B based on software code stored at least in part in the application data stores 106A, 106B. The game applications 110A, 110B may also be referred to as a videogame, a game, game code and/or a game program. A game application 110A, 110B should be understood to include software code that a computing system 102A, 102B can use to provide a game for a user to play. A game application 110A, 110B may comprise software code that informs computing resources 104A, 104B of processor instructions to execute, but may also include data used in the playing of the game, such as data relating to images, game state data, audio data, and other data structures. In the illustrated example, the game application 110A, 110B include game engines 112A, 112B, game data 114A, 114B, game state information 116A, 116B, and a respawn module 120A, 120B.

The server computing system 130 can execute a game host application 110C based on software code stored at least in part in the host application data stores 134. The game host application 110C can perform services for the game applications 110A, 110B of the user computing systems 102A, 102B. A game host application 110C should be understood to include software code that a server computing system 130 can use to perform hosting services for a video game for a user to play. A game host application 110C may comprise software code that informs computing resources 104C of processor instructions to execute, but may also include data used in the servicing of the game, such as data relating to images, game state data, audio data, and other data structures. In the illustrated example, the game host application 110C includes game engine 112C, game data 114C, game state information 116C, and a respawn module 120C.

The users computing systems 102A, 102B are capable of executing the game applications 110A, 110B, which may be stored and/or executed in a distributed environment. For example, the first user computing system 102A may execute a portion of a game, and a network-based computing system such as the server computing system 130 or the second user computing system 102B may execute another portion of the game. For instance, the game may be a massively multiplayer online role-playing game (MMORPG), first person shooter (FPS) game, multiplayer online battle arena (MOBA) game, real time strategy game (RTS), strategy game, adventure game, tactics game, board game, card game, action game, battle royale game, side scrolling game, puzzle game, sports game, fighting game, casual game, city building game, or other game type that includes a client portion executed by the user computing systems 102A, 102B and a server portion executed by one or more server computing systems 130.

Game Engine

The game engines 112A, 112B can be configured to execute aspects of the operation of the game applications 110A, 110B within the respective user computing devices 102A, 102B. The game engine 112C can be configured to execute aspects of the operation of the game host application 110C. Execution of aspects of gameplay within a game application can be based, at least in part, on the user inputs received, the game data 114A, 114B, 114C and game state information 116A, 116B, 116C. The game data 114A, 114B, 114C can include game rules, environmental settings, constraints, models, audio, visuals, units, databases, and/or other game application information.

One or any combination of the game engines 112A, 112B, 112C can execute gameplay within the game according to the game rules. Examples of game rules can include rules for scoring, possible inputs, actions/events, movement in response to inputs, and the like in a virtual environment. Other components can control what inputs are accepted and how the game progresses, and other aspects of gameplay. The game engines 112A, 112B, 112C can receive and/or process the user inputs and determine in-game events, such as actions, jumps, runs, throws, attacks and other events appropriate for the game applications 110A, 110B, 110C. During runtime operation, the game engines 112A, 112B, 112C can read in game data 114A, 114B, 114C and game state information 116A, 116B, 116C to determine the appropriate in-game events.

After one or more of the game engines 112A, 112B, 112C determine character events, the character events can be conveyed to a movement engine that can determine the appropriate motions the characters should make in response to the events and pass those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user. The process can repeated for rendering each frame during execution of the game application. Though the process has been described in the context of a character, the process can be applied to any process for processing events and rendering the output for display to a user.

Game Data

The game data 114A, 114B, 114C can include game rules, prerecorded motion capture poses/paths, virtual environment settings, virtual environmental objects, constraints, skeleton models, audio, visuals, databases, and/or other game application information. At least a portion of the game data 114A, 114B, 114C can be stored in respective application data stores 106A, 106B, 106C. In some examples, a portion of the game data 114A, 114B, 114C may be received and/or stored remotely and be received through the network 108 during runtime of the game application.

Game State Information

During runtime, the game applications 110A, 110B, 110C can store game state information 116A, 116B, 116C, which can include a game state, character states, environment states, scene object storage, and/or other information associated with a runtime state of the video game. For example, the game state information 116A, 116B, 116C can separately or collectively identify the state of the game applications 110A, 110B, 110C at a specific point in time, such as a character position, character orientation, character action, game level attributes, unit locations, item locations, and other information contributing to a state of the game. The game state information can include dynamic state information that continually changes, such as character movement positions, and static state information, such as the identification of a game level within the game.

Respawn Module

The respawn modules 120A, 120B, 120C can perform various functions to respawn characters within the game application 110A, 110B, 110C and can operate during runtime of the game application 110. The respawn modules 120A, 120B, 120C can use any combination of game data 114A, 114B, 114C and game state information 116A, 116B, 116C to perform various respawn functions.

As players provide user inputs to control characters within the game application, one or more respawn modules 120A, 120B, 120C can configure the states of characters in response to actions within the video game. For example, the respawn module can be configured to implement one or more parts of the flowchart 200 described with respect to FIG. 2A and FIG. 2B. In some embodiments, the respawn modules 120A, 120B, 120C can be implemented as a part of the respective game engines 112A, 112B, 112C.

Network

The network 108 can include any type of communication network. For example, the network 108 can include one or more of a wide area network (WAN), a local area network (LAN), a cellular network, an ad hoc network, a satellite network, a wired network, a wireless network, and so forth. In some examples, the network 108 can include the Internet.

Example Process

Figure 2A:
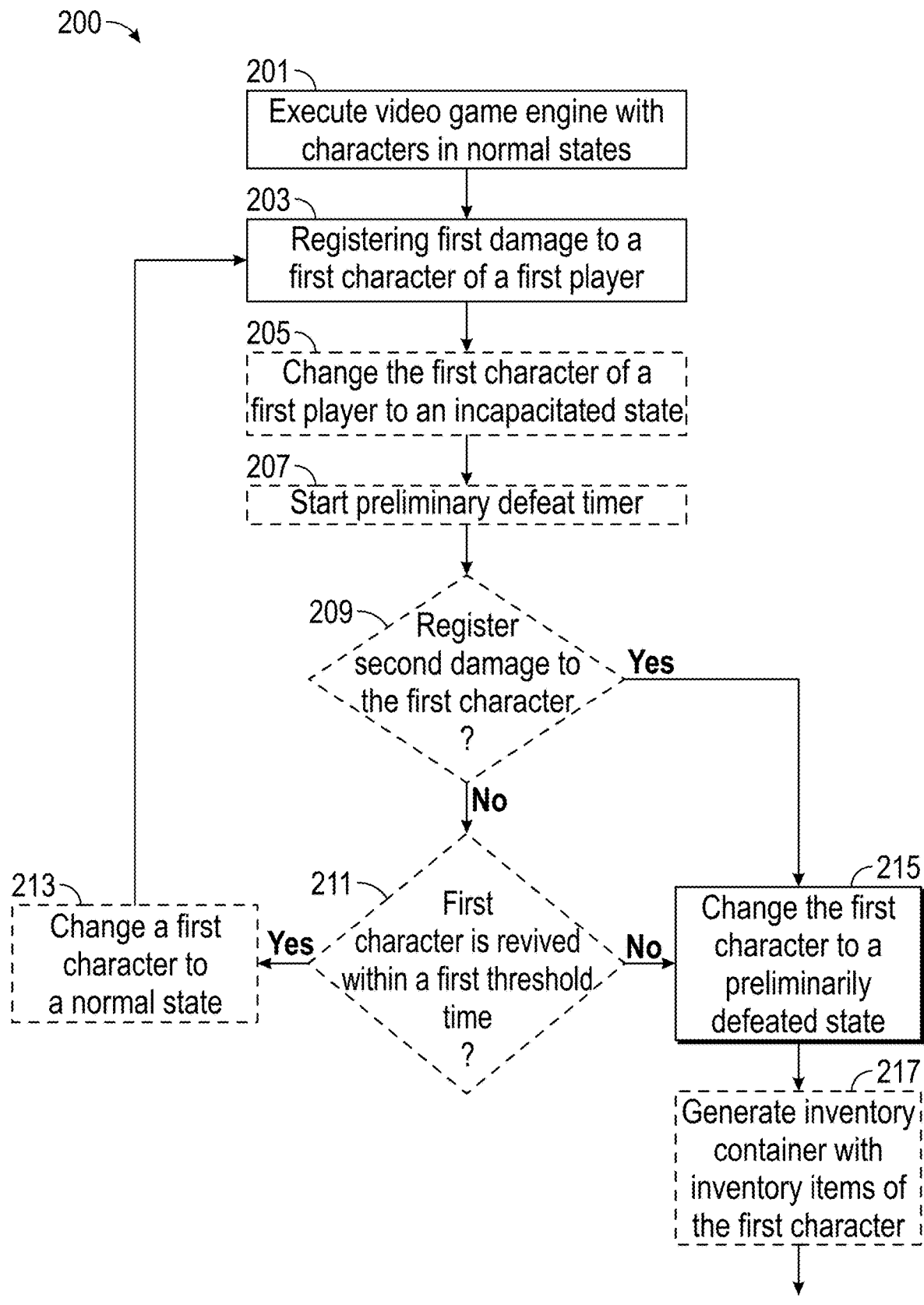
FIG. 2A and FIG. 2B show a block diagram of an example process for changing character states in a video game.
Figure 2B:
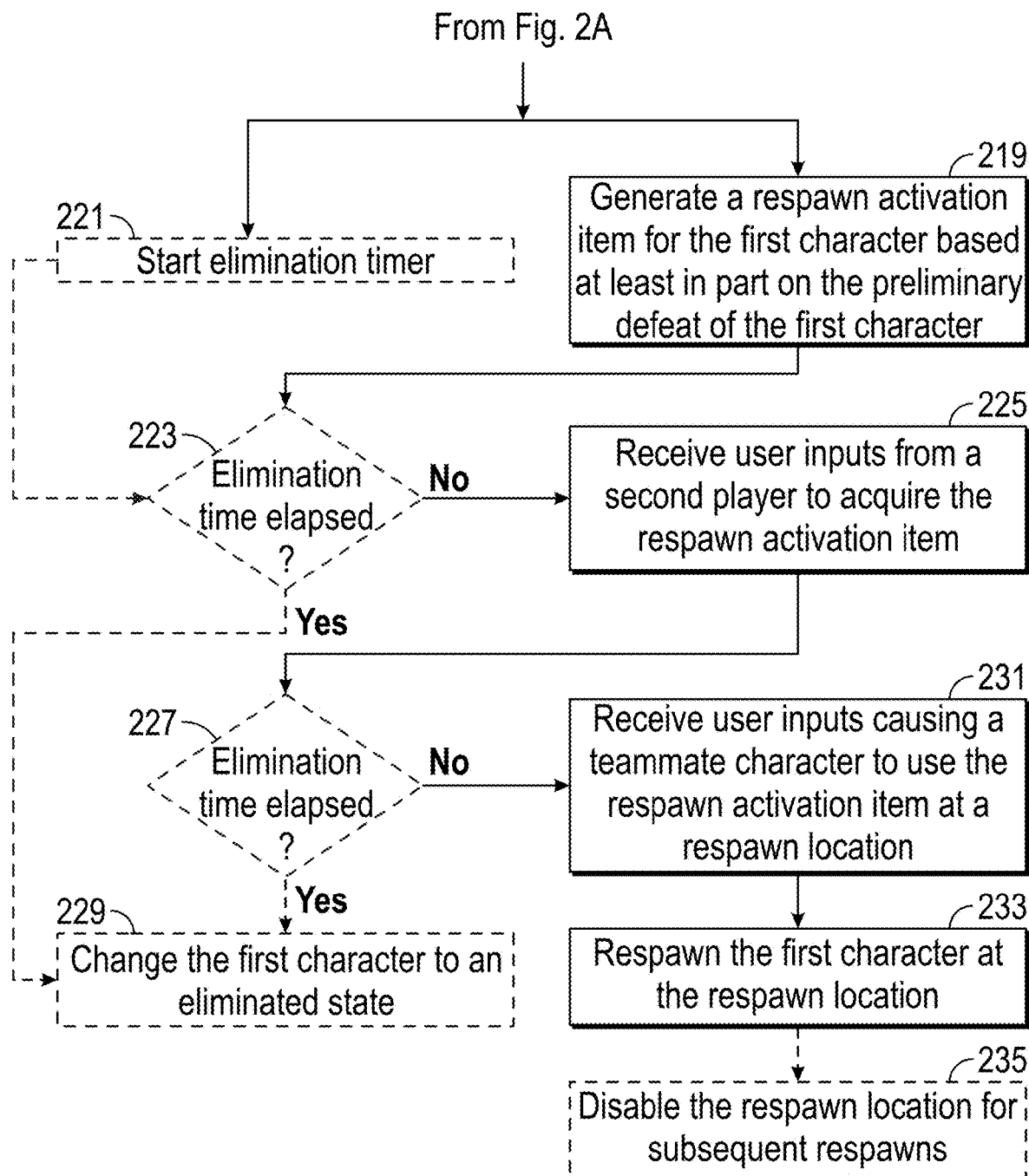

FIG. 2A and FIG. 2B show a block diagram of an example process for changing character states in a video game.

At block 201, a video game engine can be executed with characters in normal states. The characters in normal states can include a first character controlled by a first player. In a normal state, the characters can respond to user inputs to move according available movement actions, use one or more inventory items, and/or use one or more available abilities according to the game rules. In some examples, the characters have walking, running, jumping, crouching, standing, and turning as available movement options in the normal state. In some examples, the characters can use primary weapons, secondary weapons, upgrades, power-ups, potions, energy sources, and/or other inventory items in the normal state. In some examples, the characters can use attacking abilities, defensive abilities, movement abilities, charged up abilities, ultimate abilities, and/or other abilities while in the normal state.

The characters can be controlled by a plurality of players on one team. In some embodiments, players from a plurality of teams competing against each other can each control one or more characters in the video game.

At block 203, at least first damage is registered to a first character controlled by a first player. The damage can be caused by other characters, characters controlled by players on other teams, neutral in-game characters, non-player characters, environmental sources, and the like. The first damage can be a first quantity and/or first type of damage. The first damage can in a sufficient quantity over a period of time such that the first character's health is depleted to a health threshold. In some embodiments, block 203 can proceed to block 205. In some embodiments, block 203 can proceed to block 215.

At block 205, the first character can optionally be changed from the normal state to an incapacitated state. The change to the incapacitated state can occur based at least in part in response to the first character registering the first damage. In the incapacitated state, the first character can be restricted from using one, some, or all of the movement actions, inventory items, and/or abilities available while in the normal state. In some embodiments, a different set of movement actions, inventory items, and/or abilities can be made available for the first character to use while in the incapacitated state. For example, the first character can be restricted from walking, running, jumping, crouching, and standing. Instead, the first character may be able to crawl slowly and turn. As another example, the first character may be limited to using a subset of the inventory items. For example, the first character may be restricted from using primary weapons but allowed to use secondary weapons in the incapacitated state. In some examples, while in the incapacitated state, the first character can use one or more items not available for use during the normal state, such as a shield or a revival item. As another example, the first character can be restricted from using some or all of the abilities available in the normal state. In some examples, while incapacitated, the first character can use a separate ability not available during the normal state, such as a hiding ability.

At block 207, a preliminary defeat timer can optionally be started. The preliminary defeat timer can start counting toward a first threshold time during which the first character can be revived by teammates. After the first threshold time expires, the first character is changed from the incapacitated state to the preliminarily defeated state.

At block 209, it can optionally be determined if second damage is registered to the first character. In some embodiments, the second damage can be a same or different quantity and a same or different type as the first damage. If the second damage is registered to the first character, then block 209 can proceed to block 215. Otherwise, block 209 can proceed to block 211.

At block 211, it can be optionally determined if the first character is revived within a threshold time. In some embodiments, the first character can be revived by a teammate who approaches and performs a revival interaction with the first character in the virtual world. The first player and teammates are incentivized to stay together in the virtual world during game play to facilitate revival interactions should any team member become incapacitated. In some embodiments, the first character can self-revive, such as by using an item. If the first character is revived, then block 211 can proceed to block 213. Otherwise, block 211 can proceed to block 215.

At block 213, the first character can change from the incapacitated state to a normal state. The change to the normal state can occur based at least in part as a response to a teammate character approaching the first character and interacting to revive the first character, such as by providing health, first aid, assistance, or other support to the first character.

At block 215, the first character can change from the incapacitated state to a preliminarily defeated state. The change to the preliminarily defeated state can occur based at least in part on one or more of taking the second damage or an elapsing of the first threshold time. When preliminarily defeated, the first character can be made inactive and/or removed from the virtual environment. The first character can be unable to move, attack, be attacked, interact, and/or perform other actions in the game. In some examples, a preliminarily defeated player can continue to spectate or watch aspects of the game without controlling the movements or actions of any character.

At block 217, an inventory container with the inventory items of the first character can optionally be generated. The inventory items can be acquired by other characters in the game who approach and interact with the inventory items in the virtual world. In various embodiments, the inventory items can be made available for acquisition by other characters with or without an inventory container. The inventory items can be made available at or within a threshold distance of a location in the virtual environment where the first character is preliminarily defeated in response to the preliminary defeat of the first character.

At block 219, a respawn activation item for the first character can be generated based at least in part in response to the preliminary defeat of the first character. The respawn activation item can be any item used to respawn a preliminarily defeated teammate's character. In various embodiments, the respawn activation item can be, for example, a token, a card, a banner, a body, a soul, a trinket, a flag, a dog tag, a name tag, a symbolic item, a magical item, an icon, and the like. The respawn activation item can be generated at a location in the virtual environment that is at, within a threshold distance of, or otherwise determined based on a location where the first character is preliminarily defeated. In various implementations, the respawn activation item can be included in the inventory container or separated from the inventory container. The respawn activation item can be acquired by a teammate and used to respawn the preliminarily defeated character at a respawn location.

At block 221, an elimination timer can optionally be started in response to the preliminary defeat of the first player. The elimination timer can start counting toward a second threshold time during which the respawn activation item can be acquired by teammates and/or the first character can be respawned. After the second threshold time expires at either blocks 223 or 227, the first character is changed from the preliminarily defeated state to an eliminated state at block 229. When eliminated, a player's character can be taken out of the game and/or otherwise prevented from being further controlled to affect the game without opportunities for revival or respawning.

In some implementations, the elimination timer counts toward the second threshold time during which the respawn activation item can be acquired by teammates, such as shown in block 223, without limiting when teammates can subsequently use the respawn activation item to respawn the first character such that block 227 is omitted. In some implementations, in response to a teammate acquiring the respawn activation item, an alternative or additional elimination timer (not illustrated) can start counting toward a third threshold time during which the respawn activation item can be used to respawn the first character.

At block 225, first user inputs from a second player are received, the user inputs controlling a second character to acquire the respawn activation item. The second player can be a teammate of the first player.

At block 231, second user inputs from a teammate of the first player are received. The second user inputs cause the teammate to approach the respawn location and use the respawn activation item at a respawn location in the virtual world. In some implementations, the teammate can interact with the respawn activation item or other device to use the respawn activation item. The teammate can be the second player who acquired the respawn activation item or a different teammate. The respawn activation item can be used up or consumed when the first character is respawned, preventing subsequent reuse of the respawn activation item for the first character unless the respawn activation item is subsequently reacquired.

At block 233, the first character can be respawned at the respawn location. The first character can be respawned in the normal state with or without having any inventory items held by the first character when the first character was preliminarily defeated. The first character can be respawned within a threshold distance of the respawn location. The first character is respawned based at least in part on a teammate acquiring the respawn activation item for the first character and any teammate using the respawn activation item for the first character at any respawn location. By respawning the first teammate at a location in the virtual world that is within a threshold distance of the respawn location selected by a teammate, the first player and the teammate are motivated to resume play as a team.

At block 235, the respawn location can optionally be disabled for subsequent respawns. In various embodiments, respawn locations can optionally be used for any limited or unlimited number of times.

Normal State Examples

Figure 3:
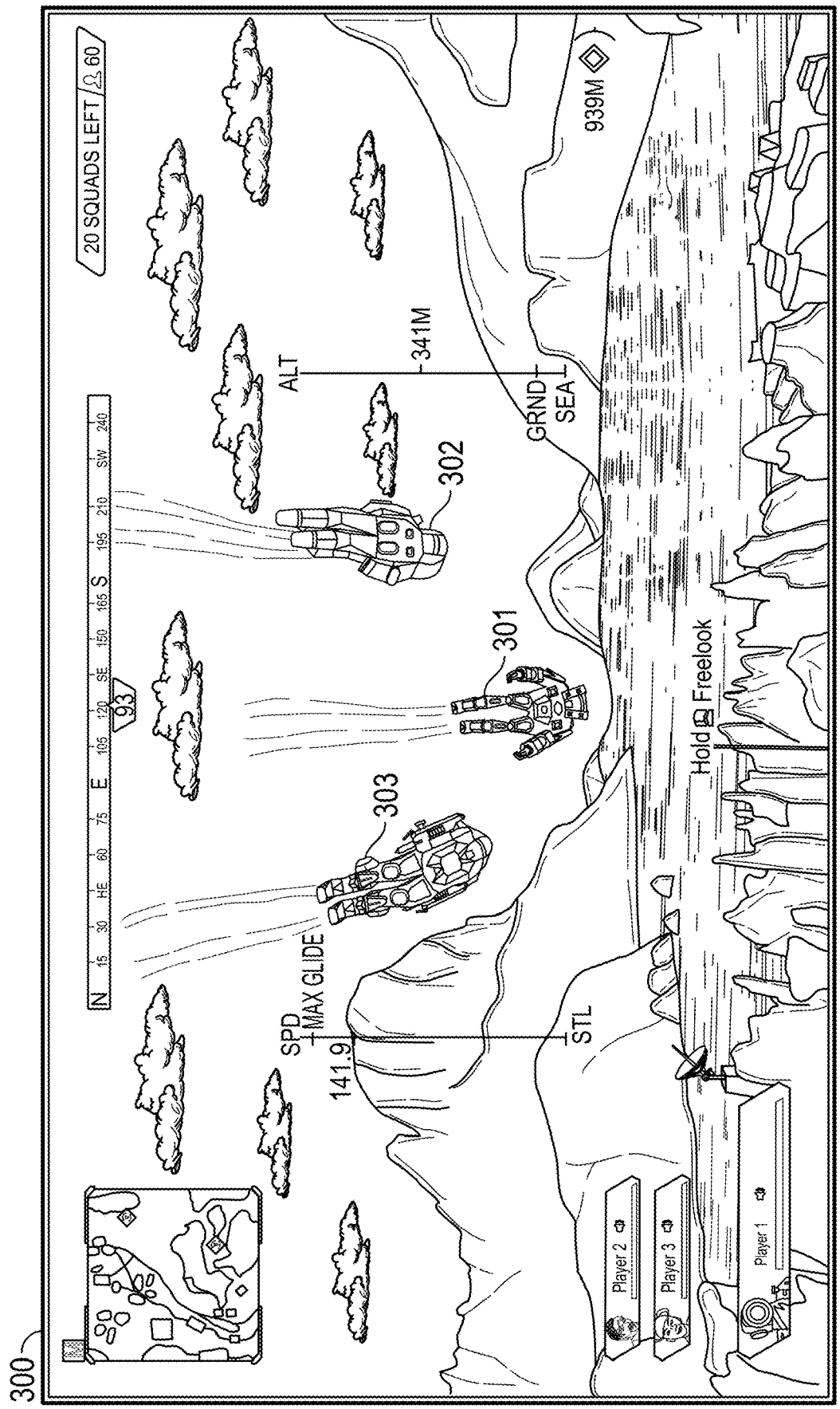
FIG. 3 shows an example illustrated screenshot of a first player's field of view in a video game with a second player and a third player.

FIG. 3 shows an example illustrated screenshot 300 of a first player's field of view during a first part of a game showing characters in a normal mode. The illustration 300 shows a third-person perspective of a virtual 3D environment in the game as displayed to the first player. The illustration 300 shows a first character 301, a second character 302, and a third character 303.

The first character 301 is controlled by the first player, the second character 302 is controlled by a second player, and the third character 303 is controlled by a third player. The first, second, and third player make up a first team. There may be any number of players on a single team. For example, a team may be composed three players each controlling one separate character, 50 different players controlling 50 characters, 10 players jointly controlling 30 characters, or any plurality of players jointly or individually controlling any plurality of characters.

The first character 301, second character 302, and the third character 303 are in the normal state (such as described with respect to block 201 of FIG. 2). During a first part of the game, the characters 301, 302, and 303 are gliding through the air. The characters can glide in any direction and adjust their speed in response to player inputs, and some characters can use special abilities while gliding through the air.

Figure 4A:
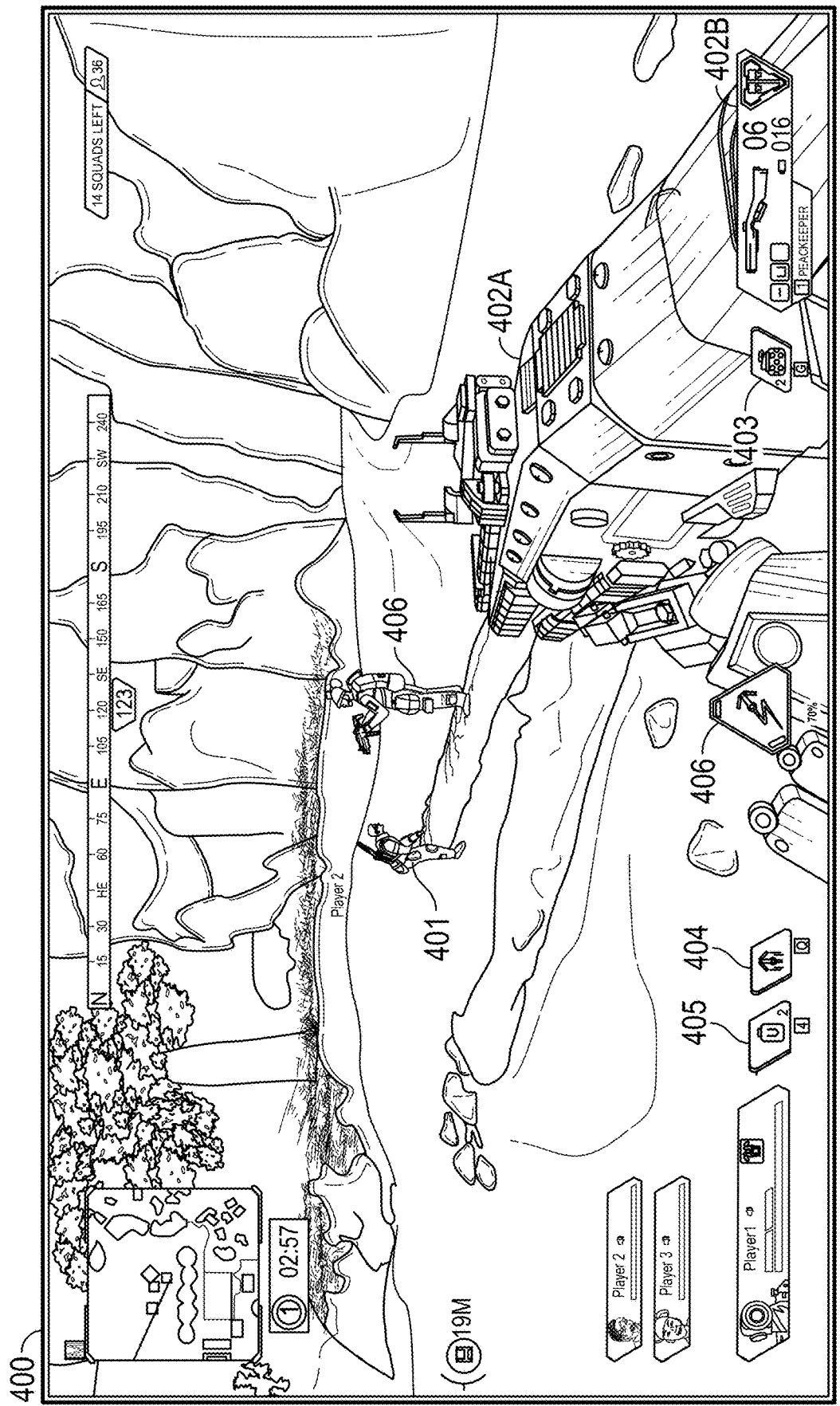
FIG. 4A shows an example illustrated screenshot of the first player's field of view observing characters in a normal state.

FIG. 4A shows an example illustrated screenshot 400 of the first player's first-person perspective observing the second character 401 and a fourth character 406 in normal states (such as described with respect to block 201 of FIG. 2). The fourth character 406 is not on the same team as the first player. For example, the fourth character can be an enemy controlled by a fourth player on a second team, or the fourth character can be a non-player character not controlled by any player.

In the normal state, the first player is able to perform a variety of actions. A user interface of the first player shows a shotgun 402A, a shotgun icon 402B, a grenade icon 403, an ability icon 404, and an energy shield icon 405. In the normal state, the first player can provide user inputs to look around, aim, and fire the shotgun. In the normal state, the first player can also provide user inputs to throw the grenade represented by icon 403, to use the ability represented by icon 404, or charge an energy shield as indicated by icon 405.

Figure 4B:
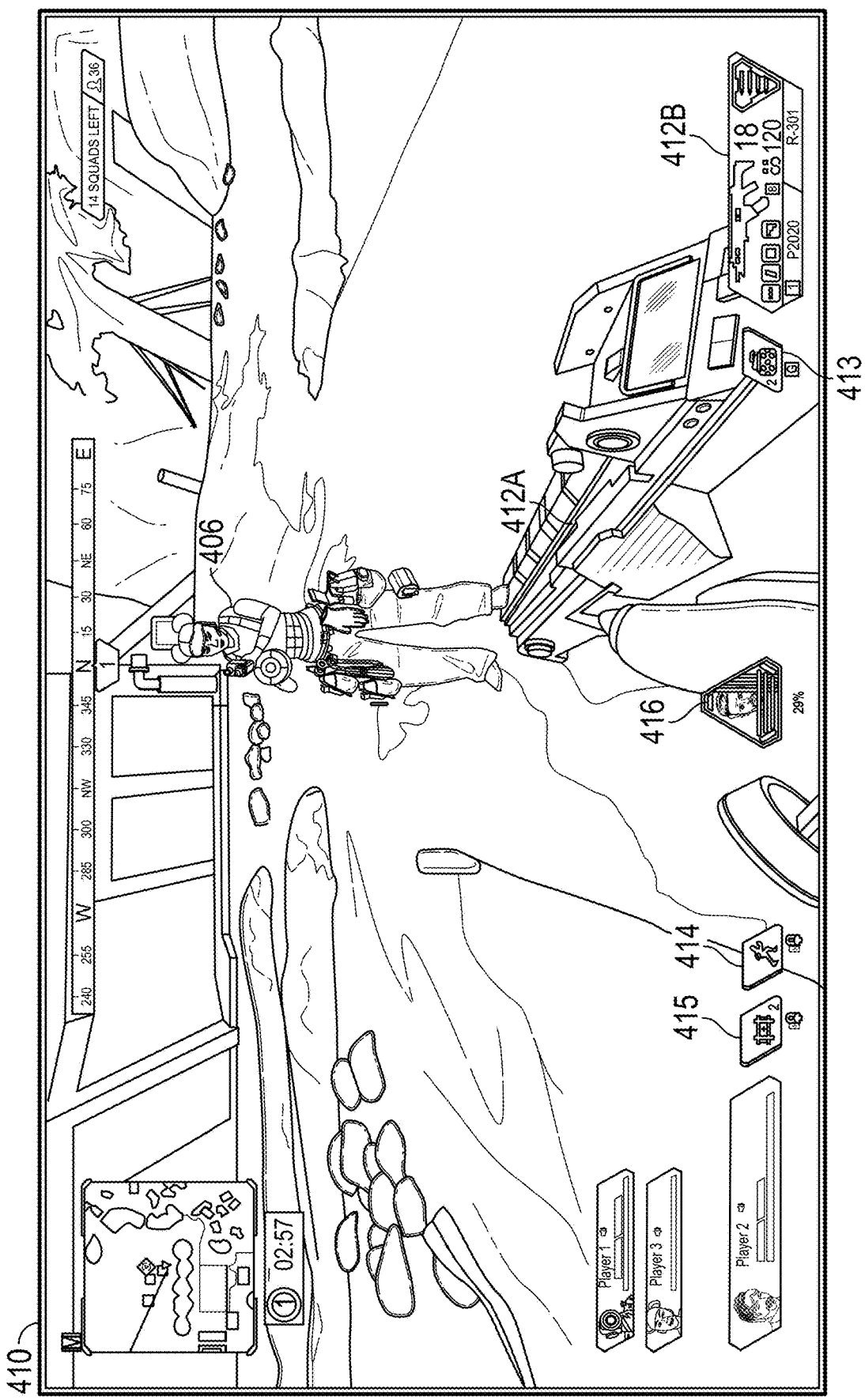
FIG. 4B shows an example illustrated screenshot of the second player's field of view when the second player's character is in the normal state.

FIG. 4B shows an example illustrated screenshot 410 of the same game state as illustration 400 from the second player's first-person perspective. The user interface of the second player includes a rifle 412A, a rifle icon 412B, a grenade icon 413, an ability icon 414, an ultimate ability icon 416, and a health kit 415.

In the normal state, the second player is able to perform a variety of actions. In the normal state, the second player can provide user inputs to look around, aim, and fire the rifle 412A. In the normal state, the second player can also provide user inputs to throw the grenade represented by icon 413, to use the ability represented by icon 414, or use the health kit 415.

In the example shown in FIG. 4B, the fourth character 406 is pointing a weapon at the second player's character. The second player's character takes first damage when attacked by the weapon (such as described with respect to block 203 of FIG. 2). If the damage received by the second character exceeds a threshold quantity, then the second character can be changed from a normal to an incapacitated state (such as described with respect to block 205 of FIG. 2).

In other examples, the second character can also take first damage from other sources. For example, the second character can take first damage from an attack by other characters, from the second character's own special ability that consumes health, from the second character's own grenade, from the second character interacting with environmental objects, from the second character falling from too high of a distance, and the like.

Example Incapacitated State

Figure 5A:
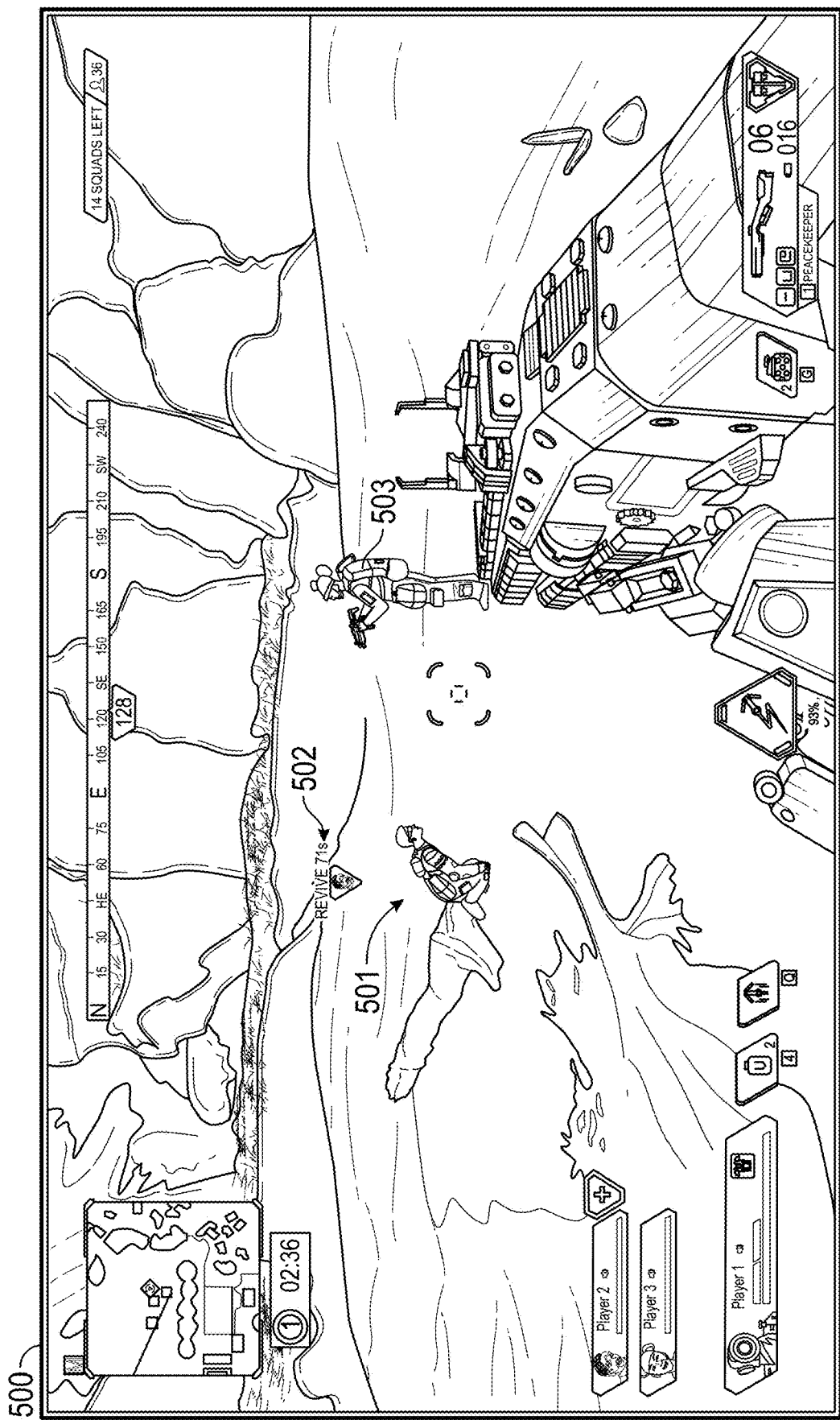
FIG. 5A shows an example illustrated screenshot of the first player's field of view when the second player's character is in an incapacitated state.

FIG. 5A shows an example illustrated screenshot 500 of the first player's first-person perspective with the second character 501 in an incapacitated state after taking first damage from the fourth character 503. The first player's user interface shows a revival icon 502 with a timer.

While in the incapacitated state, the second character 501 is shown as downed, and the second character 501 is still able to move and interact with the virtual environment. As further discussed with respect to FIG. 5B, the second character 501 is unable to perform normal movements, use normal abilities, and/or use normal items while in the incapacitated state.

The revival icon 502 can be displayed to teammates. The revival icon 502 can appear at a location of the second character 501 in the virtual environment. The first player and other teammates can use the icon to navigate through the virtual environment to approach and revive the second character 501. The revival icon 502 can indicate the progress of a preliminary defeat timer (such as described with respect to block 207 of FIG. 2).

Figure 5B:
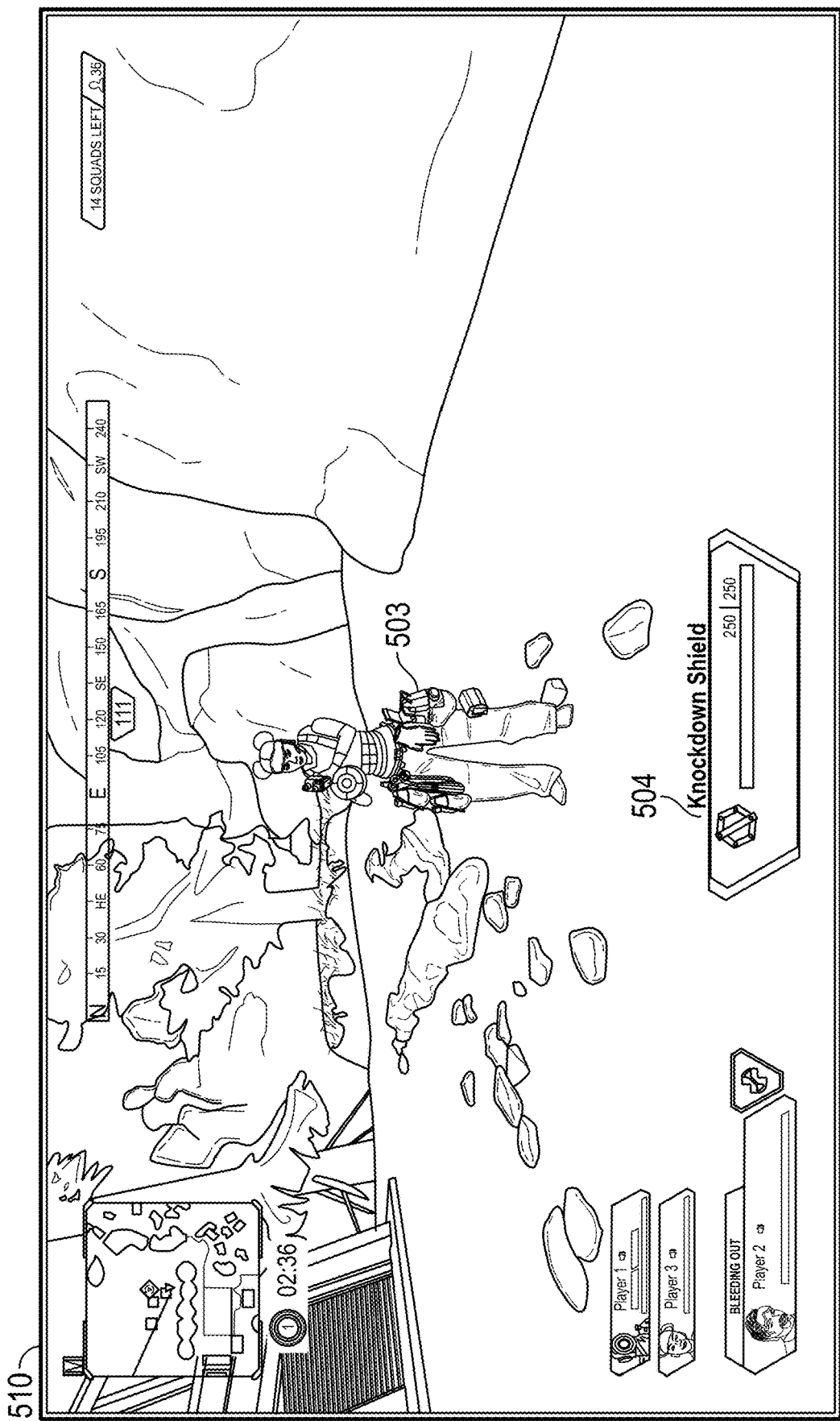
FIG. 5B shows an example illustrated screenshot of the second player's field of view when the second player's character is in the incapacitated state.

FIG. 5B shows an example illustrated screenshot 510 of the same game state as illustration 500 from the second player's first-person perspective while in the incapacitated state. The illustration 500 shows the fourth character 503 and a knockdown shield icon 504. As shown by FIG. 4B and FIG. 5B, the user interface of the second player can change based at least in part on whether the second character is in a normal state or in the incapacitated state.

While in the incapacitated state, the second player can use a knockdown shield represented by the knockdown shield icon 504. The second player is restricted from using one or more of the movements, weapons, items, and/or abilities described with respect to FIG. 4B such as the weapon 412A, ability 414, ultimate ability 416, and item 405.

Figure 5C:
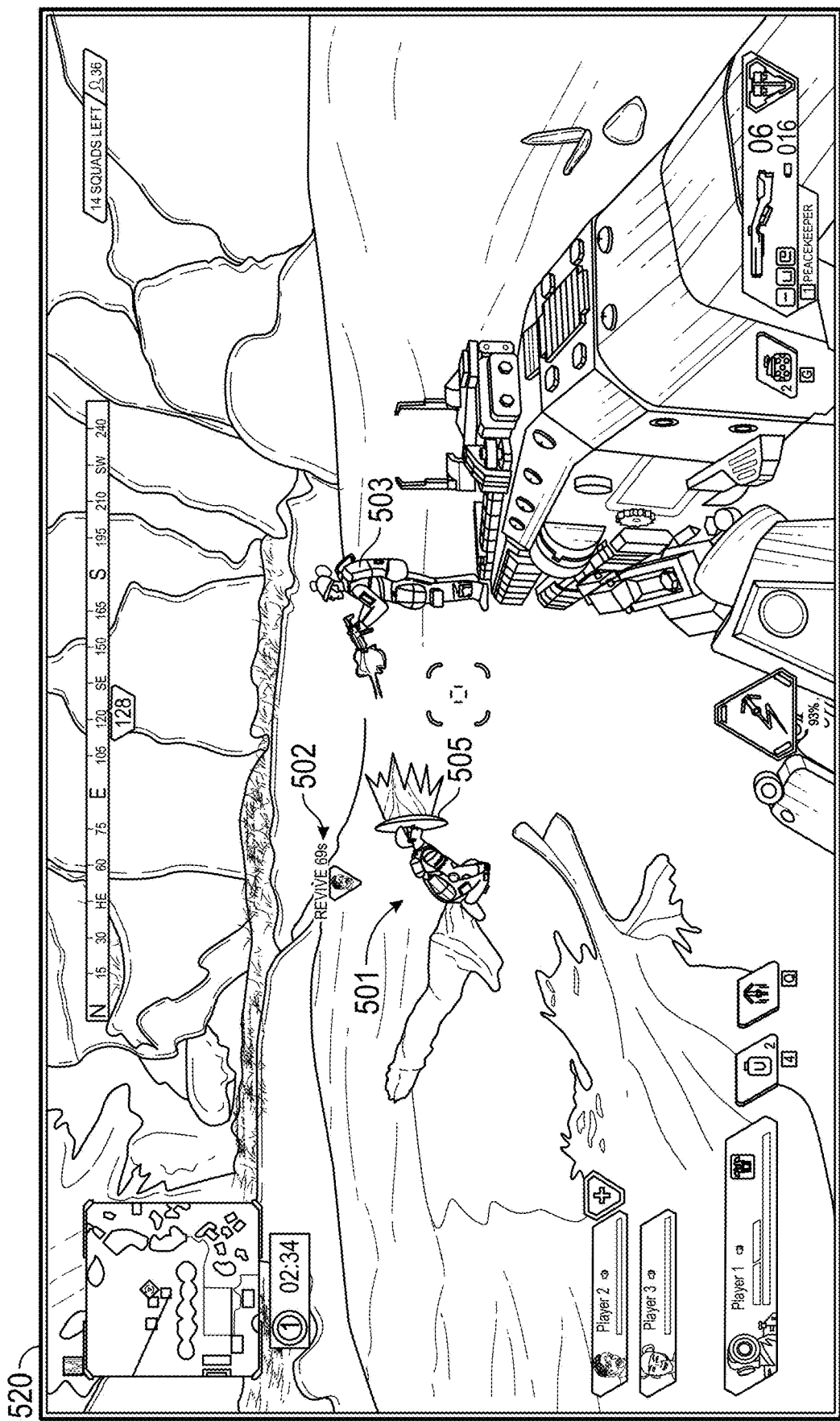
FIG. 5C shows an example illustrated screenshot of a first player's field of view when the second player's character is using an item in the incapacitated state.

FIG. 5C shows an example illustrated screenshot 520 from the first player's first-person perspective observing a second character 501 using an item 505. The screenshot 520 shows the second character 501, the revival icon 502, the fourth character 503, and a knockdown shield 505.

The fourth character 503 is shooting at the second character 501. The second character 501 is still in the incapacitated state and is using a knockdown shield 505 to deflect the attack from the fourth character 503. In some implementations, the second character 501 is restricted from using certain inventory items such as primary weapons while in the incapacitated state. In some implementations, the second character 501 can be restricted from a subset of the movements, weapons, items, and/or abilities available during the normal state. In some implementations, in the incapacitated state, the second character 501 can make some movements, use some items, and/or use some abilities that are unavailable for use when in the normal state. For example, the second character can have movement abilities such as crawling, use secondary or backup weapons, and/or use secondary or backup abilities.

If the second character 501 receives second damage, or if the timer in the revival icon 502 indicates that the preliminary defeat time has passed, the second character 501 can be changed to a preliminarily defeated state (such as described with respect to block 215 of FIG. 2A).

Figure 5D:
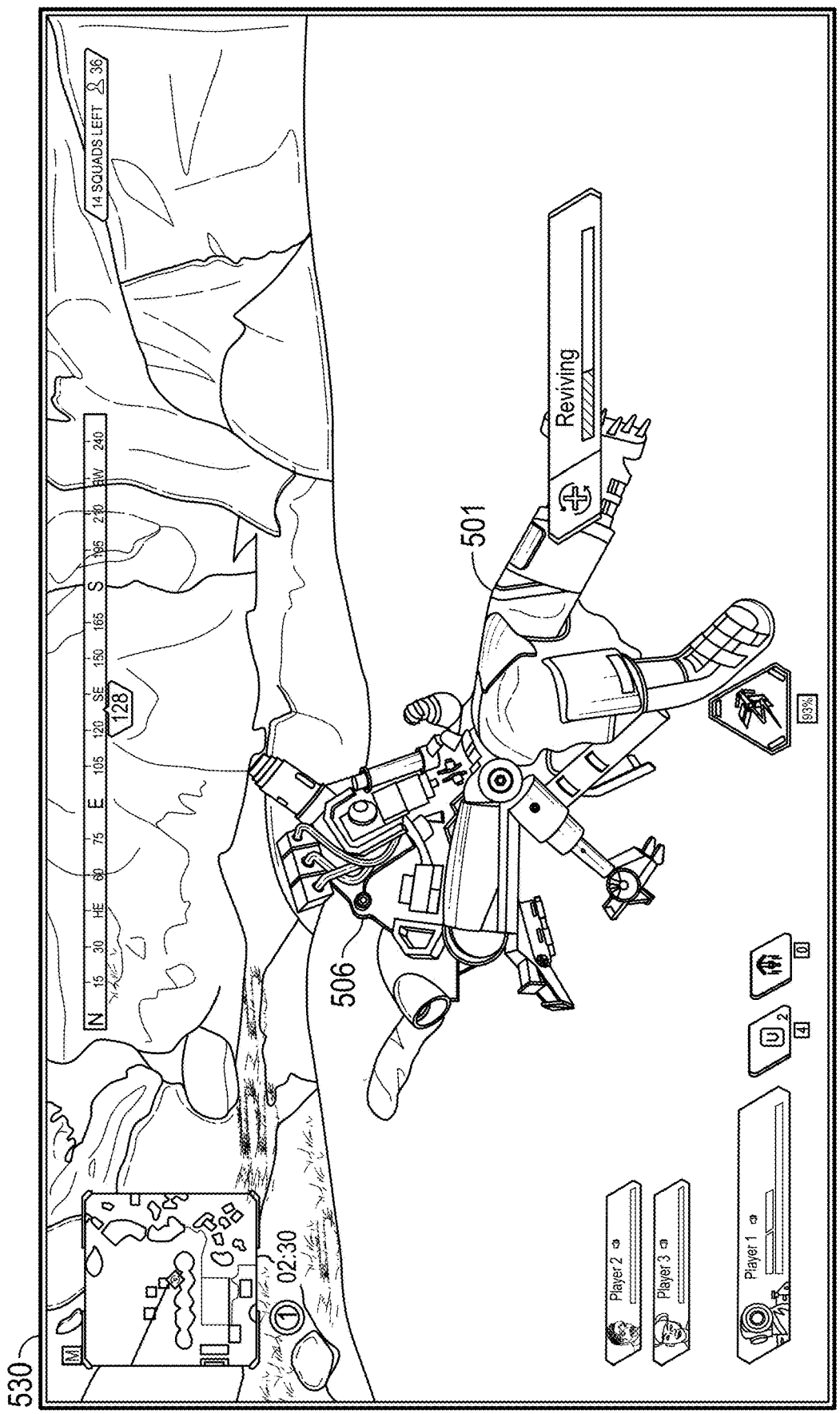
FIG. 5D shows an example illustrated screenshot of a first player's field of view in which the first player's character is changing the second player's character from the incapacitated state to the normal state.

FIG. 5D shows an example illustrated screenshot 530 from a third-person perspective of a first character 506 reviving an incapacitated second character 501 back to a normal state. The first character 506 has approached within a threshold distance of the second character 501 and is reviving the second character 501. The revival process can be instantaneous or otherwise take a threshold amount of time. The revival process can be stopped by the first player. The first character 506 can be immobilized and vulnerable to damage during the revival process. If the revival is successful, the second character 501 is reverted back to the normal state (such as described with respect to block 213 of FIG. 2A).

Examples of Preliminary Defeat

Figure 6:
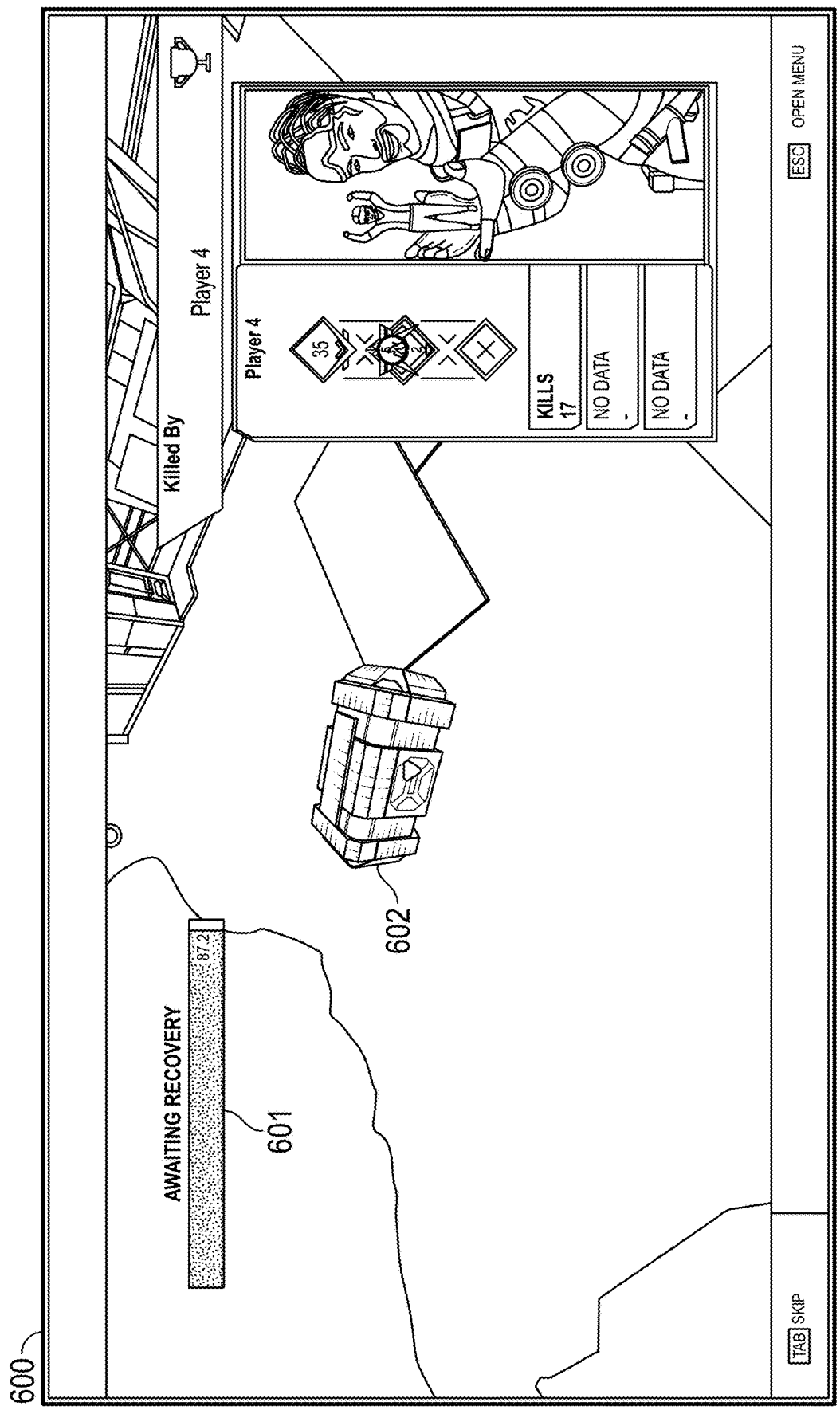
FIG. 6 shows an example illustrated screenshot of the second player's field of view when the second player's character is preliminarily defeated.

FIG. 6 shows an example illustrated screenshot 600 from the second player's field of view when the second character 501 of FIG. 5C was preliminarily defeated at a first location in a virtual environment. The second character 501 of FIG. 5C can be changed to the preliminary defeated state if the second character takes second damage instead of being revived (such as described with respect to blocks 211 and 215 of FIG. 2A). A recovery timer 601 can start, and an inventory container 602 can appear at or near the first location.

The recovery timer 601 can start based at least in part in response to the preliminary defeat of the second player (such as described with respect to block 221 of FIG. 2B). The recovery timer 601 can appear in the user interfaces of the preliminarily defeated player and/or the preliminarily defeated player's teammates. If the recovery timer 601 reaches zero, the second character is eliminated (such as described with respect to block 229 of FIG. 2B). As illustrated by FIG. 5B and FIG. 6, the user interface for the second player can change in response to a character changing from the incapacitated state to a preliminarily defeated state. After a preliminary defeat, a player can optionally continue to spectate gameplay, such as by spectating the game as seen by other teammates.

The inventory container 602 contains the second player's inventory and is generated based at least in part in response to the second character's preliminary defeat (such as described with respect to block 217 of FIG. 2A). The inventory container 602 can include a respawn activation item for the preliminarily defeated player. The inventory container 602 can also include inventory items held by the second character when the second character was preliminarily defeated.

Figure 7:
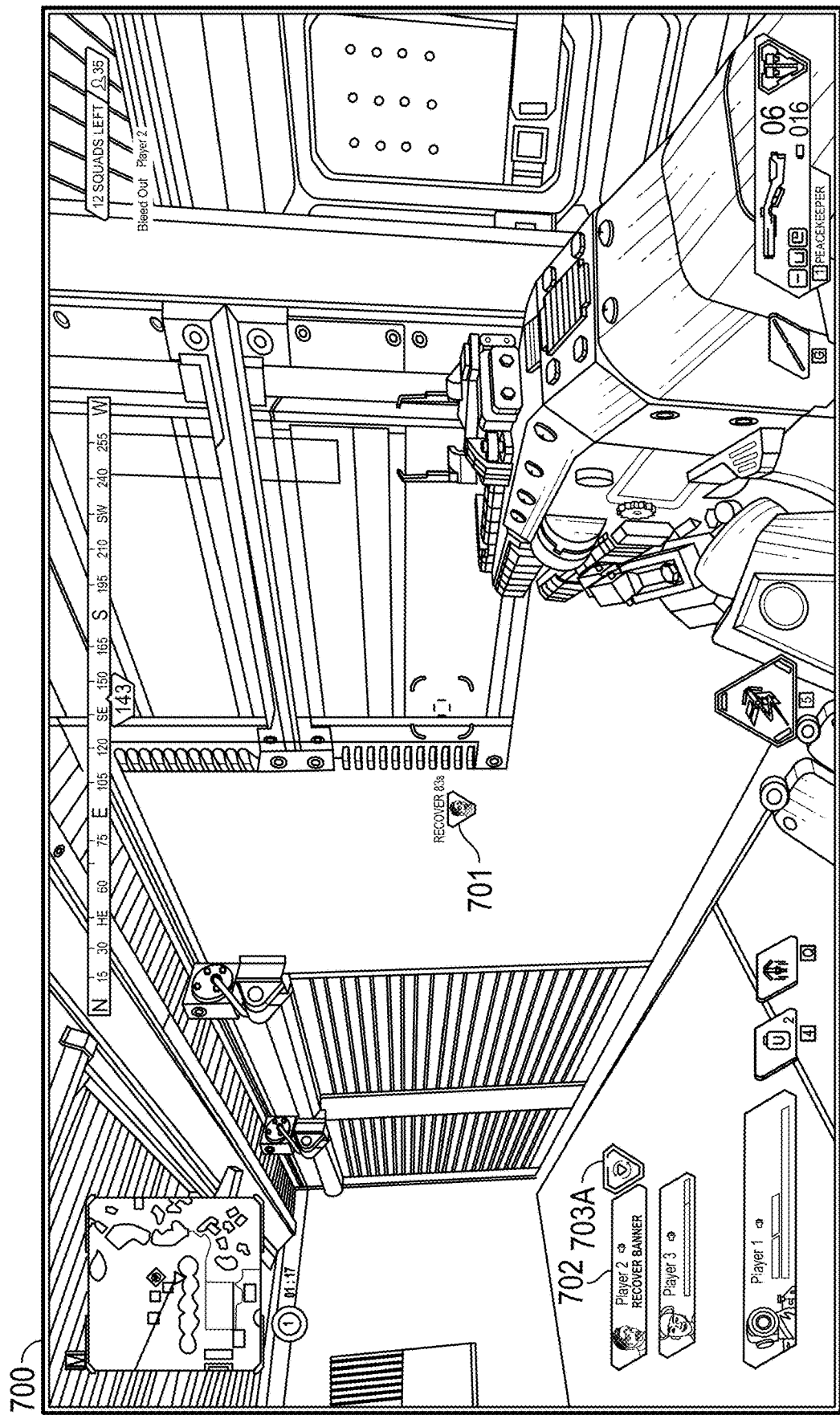
FIG. 7 shows an example illustrated screenshot of the first player's field of view from a different location when the second player's character is preliminarily defeated.

FIG. 7 shows an example illustrated screenshot 700 of the first player's first-person perspective from a second location while the second player is preliminarily defeated. The first player's user interface shows the second character's respawn activation item icon 701, the second player's status 702, and the recovery timer icon 703A.

The second character's respawn activation item icon 701 can be seen by any player in the second player's team. The second character's respawn activation item 701 can appear at the first location in the virtual environment where the second character's respawn activation item can be obtained by a teammate. In some implementations, the second character's respawn activation item icon 701 can be seen over walls or other opaque objects. The second player can provide user inputs to ping the icon 701, making the icon 701 and the first location more noticeable to team members. When pinged, the icon 701 can animate, flash, make sound effects, and the like. The first player can provide one or more user inputs to cause the first character to travel to the first location.

The second player's status 702 can indicate in the user interfaces of teammates that the second player's character is in a preliminarily defeated state. In the illustrated example, the second player's status 702 indicates that the second player's respawn activation item is available for recovery.

The recovery timer icon 703A can indicate an amount of remaining time for recovering the second player's respawn activation item and/or an amount of time for using the second player's respawn activation item to respawn the second player (for example, as described with respect to blocks 223, 227, and 229 of FIG. 2B). The icon 703A can change as time elapses, such as to display an indication of elapsed or remaining time.

Figure 8:
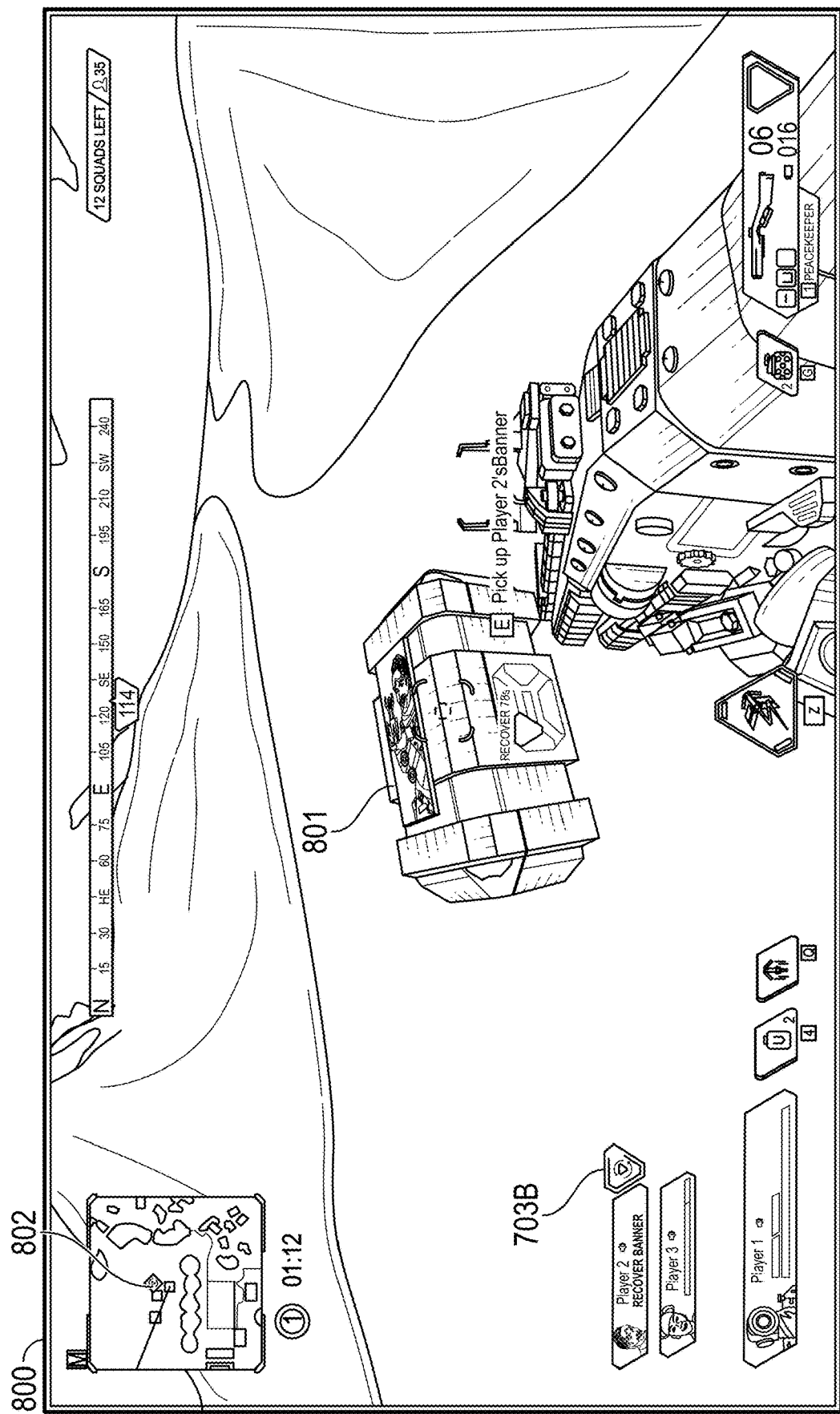
FIG. 8 shows an example illustrated screenshot of the first player's field of view with an inventory container generated in response to the second player's character's preliminary defeat.

FIG. 8 shows an example illustrated screenshot 800 from the first player's first-person perspective observing the second character's inventory container 801. In the example screenshot 800, the first player has arrived at the first location of the second character's recovery timer icon 703B, where the second character's inventory container 801 is also located.

When the first player arrives within a threshold distance of the inventory container 801 containing the respawn activation item, the first player can be prompted to provide a user input, such as pressing a particular button, to acquire the respawn activation item. The first player can then provide the prompted user input to interact with inventory container 801 to obtain a respawn activation item (such as described with respect to block 225 of FIG. 2). The respawn activation item can be generated at a location that is based on the first location where the second character was preliminarily defeated. In other examples, the inventory container can be implemented as a box, a fallen body of a defeated character, a bag, an icon, and the like. In some examples, individual inventory items and/or the respawn activation item can be dropped in the virtual environment without being grouped into any container.

The recovery timer icon 703B shown in FIG. 8 has changed from its original appearance as icon 703A in FIG. 7. The border of the recovery timer icon 703B is reduced to indicate a reduced amount of remaining time for acquiring the respawn activation item and/or respawning the second character.

Examples of Respawn Activation

Figure 9A:
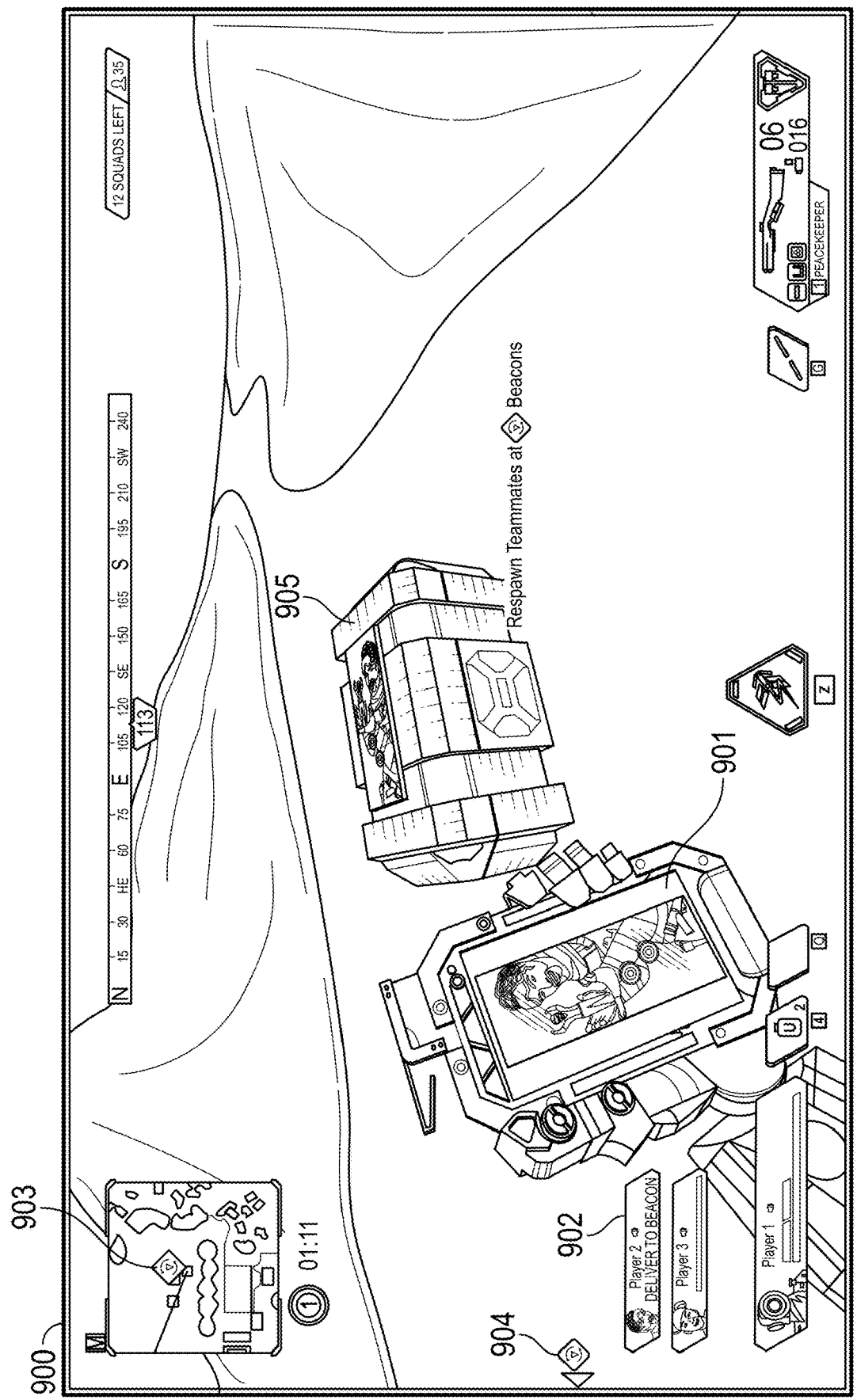
FIG. 9A shows an example illustrated screenshot of the first player's field of view in which the first player has obtained a respawn activation item.

FIG. 9A shows an example illustrated screenshot 900 of the first player's field of view after the first character has interacted with the inventory container 801. The illustration 900 shows the respawn activation item 901, the second character's status 902, a respawn location map icon 903, a respawn location interface icon 904, and an inventory container 905. The status 902, the respawn location map icon

903, and the respawn location interface icon 904 can be visible to all members of the second player's team.

The respawn activation item 901 is illustrated as a handheld banner showing a profile picture of the preliminarily defeated character. In various implementations, the respawn activation item can be any item used to respawn a preliminarily defeated teammate's character (such as described with respect to block 219 of FIG. 2B). For example, the respawn activation item can be a token, a card, a banner, a body, a soul, a trinket, a flag, a dog tag, a name tag, a symbolic item, a magical item, an icon, and the like. The respawn activation item can be generated at a location in the virtual environment that is at, within a threshold distance of, or otherwise determined based on a location where a character is preliminarily defeated. The respawn activation item can be acquired by a teammate and used to respawn the preliminarily defeated character at a respawn location. Teammates such as the first player can pick up one or any plurality of respawn activation items for any team member who was preliminarily defeated.

The respawn location map icon 903 can indicate a location of nearby respawn locations on a map of the virtual environment. The respawn location interface icon 904 is displayed as a user interface element to each teammate and indicates a direction of the nearest respawn beacon relative to each respective teammate. The second player or any preliminarily defeated player on the team can ping the respawn location map icon 903 and/or the respawn location interface icon 904 to make them more noticeable to team members, such as by briefly animating or highlighting the icon and/or playing a sound.

In some implementations, a computer system can determine distances from a player's character to nearby respawn locations. In response to a preliminarily defeated character pinging, the nearest respawn location to a first player's character can be visually and/or audibly indicated to the first player. In some implementations, a computer system can determine distances from nearby respawn locations to each player on a team. In some implementations, in response to a preliminarily defeated character pinging, a second respawn location to a third teammate's character can be visually and/or audibly indicated to the first player if the second respawn location is the closest respawn location to a third teammate's character, even if the second respawn location is not the closest respawn location to the first player's character.

Figure 9B:
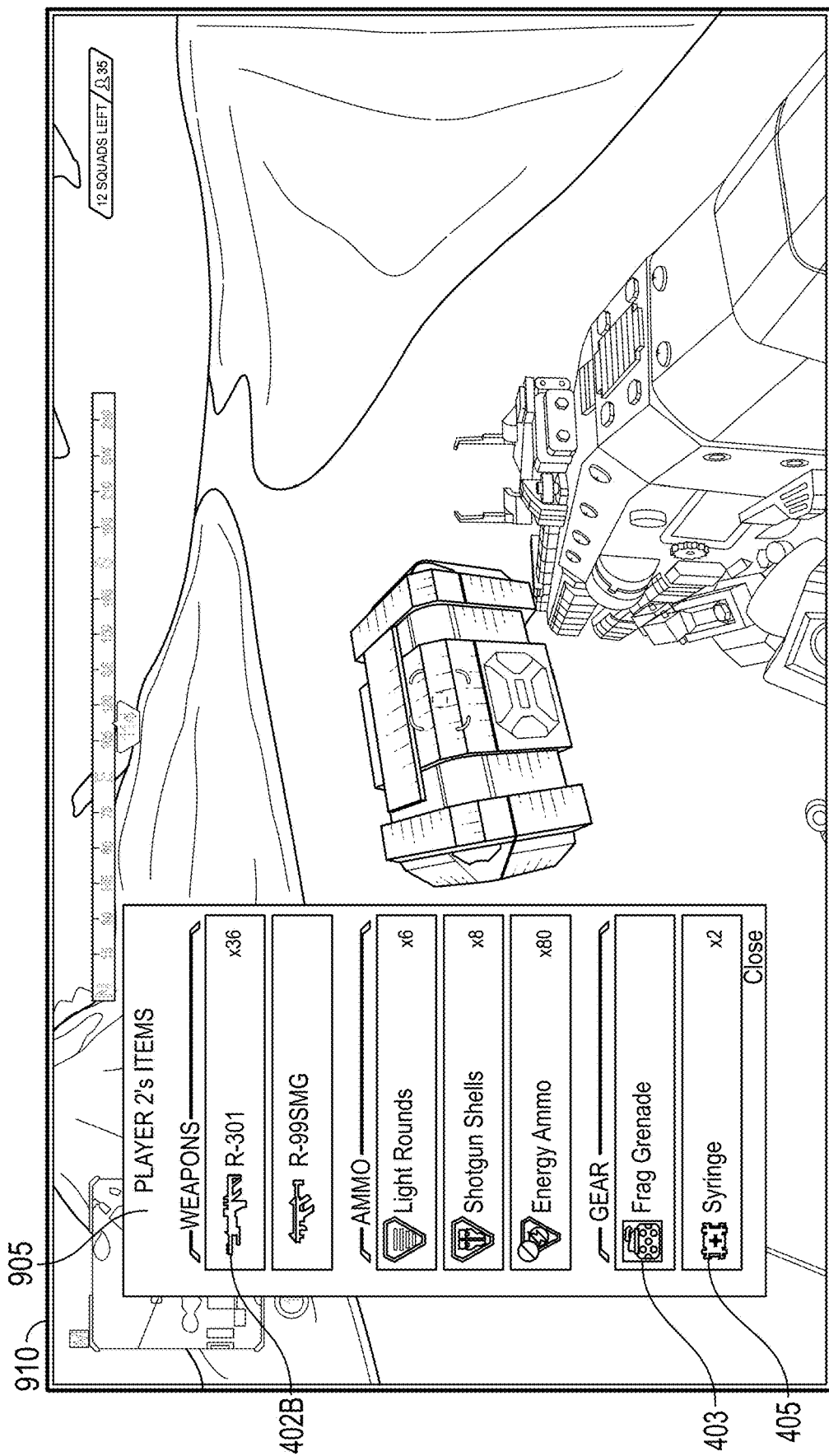
FIG. 9B shows an example illustrated screenshot of the first player's field of view displaying inventory items from the inventory container.

FIG. 9B shows an example illustrated screenshot 910 from the first player's first-person perspective showing an interaction with the second player's inventory container. The screenshot 910 shows an inventory menu 905 containing the rifle icon 412B, the grenade icon 413, and the health kit icon 415 illustrated in FIG. 4B, as well as other inventory items such as ammunition. By selecting items from the inventory menu 905, the first player can acquire the selected item. In some embodiments, other teammates and/or other players can also interact with the inventory container and acquire its contents on a first come first served basis. Accordingly, teammates can be motivated to stay close to other teammates to prevent members of other teams from looting inventory items from inventory containers of preliminarily defeated teammates.

Figure 10:
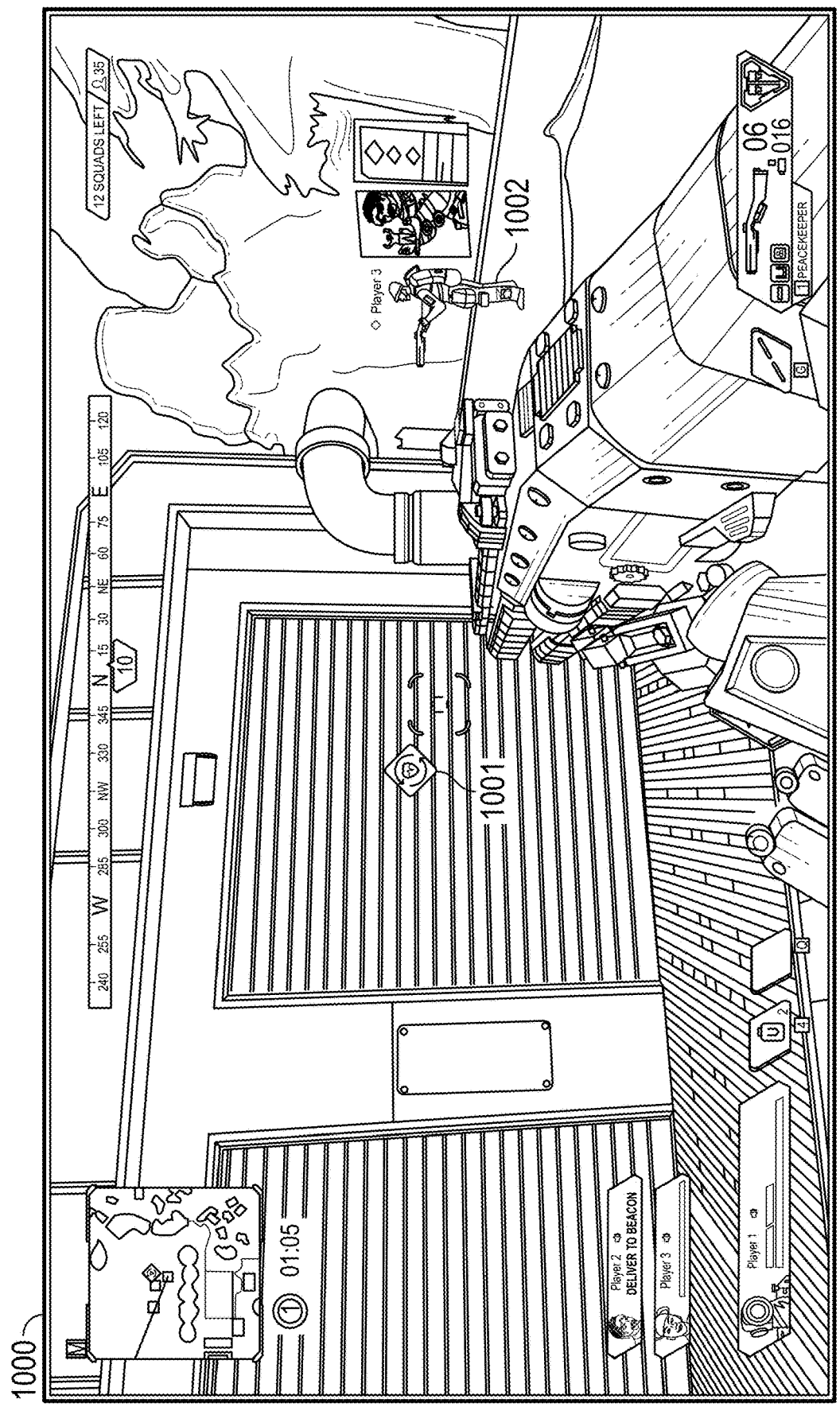
FIG. 10 shows an example illustrated screenshot of the first player's field of view in which the nearest respawn location is indicated.

FIG. 10 shows an example illustrated screenshot 1000 from the first player's first-person perspective as the first player's character approaches a respawn location. The screenshot 1000 shows a respawn location interface icon 1001 and the third player's character 1002. The icon 1001 can be seen by every member of the preliminarily defeated player's team, including the third player. The icon 1001 can be displayed over intervening opaque obstacles such as buildings, walls, and the like. In some embodiments, either the first character controlled by the first player or the third player's character 1002 can go to the respawn location to use the respawn activation item to respawn a preliminarily defeated teammate, regardless of which team member acquired the respawn activation item.

Figure 11:
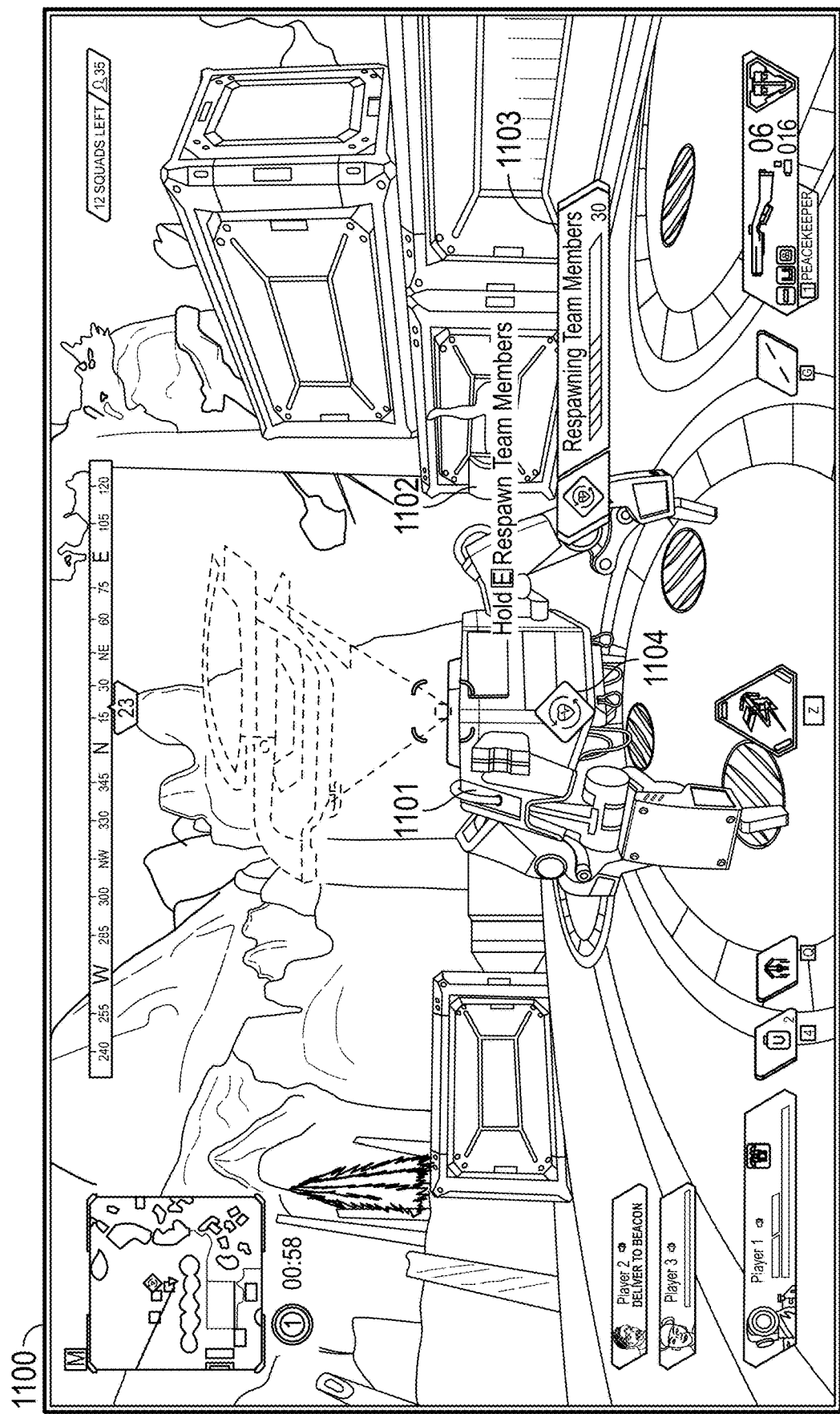
FIG. 11 shows an example illustrated screenshot of the first player's field of view when the first player is using the respawn activation item at the respawn location.

FIG. 11 shows an example illustrated screenshot 1100 from the first player's first-person perspective as the first player's character is using the respawn activation item at a respawn location. The screenshot 1100 shows a respawn beacon 1101 at the respawn location in the virtual environment indicated by the respawn location interface icon 1104, a respawn interaction prompt 1102, and a respawn progress bar 1103.

The first player's character has reached the respawn location indicated by the respawn location interface icon 1104. A respawn beacon 1101 can be present at the respawn location. In other implementations, any other item, structure, sign, symbol, or the like can be present to mark the respawn location. In some implementations, the respawn beacon 1101 can be omitted. In some implementations, the respawn beacon 1101 at the respawn location can be used once or a limited plurality of times before deactivating and preventing teams from later respawning teammates. In some implementations, the respawn beacon 1101 at the respawn location can be used for an unlimited number of times without deactivating.

The respawn progress bar 1103 can appear in response to the first player's character interacting with the respawn beacon, such as by pressing a prompted button to interact with the respawn beacon while the first player's character is within a threshold distance of the respawn location (such as described with respect to block 231 of FIG. 2). The respawn progress bar 1103 can indicate a progress of using an acquired respawn activation item to respawn a preliminarily defeated teammate. The respawn progress can be instantaneous or otherwise take an amount of time. In some implementations, if a team has acquired a plurality of respawn activation items generated based at least in part in response to a plurality of preliminarily defeats of characters, all respective preliminarily defeated characters can be respawned together in parallel. In some implementations, preliminarily defeated teammates can be respawned in series.

Figure 12A:
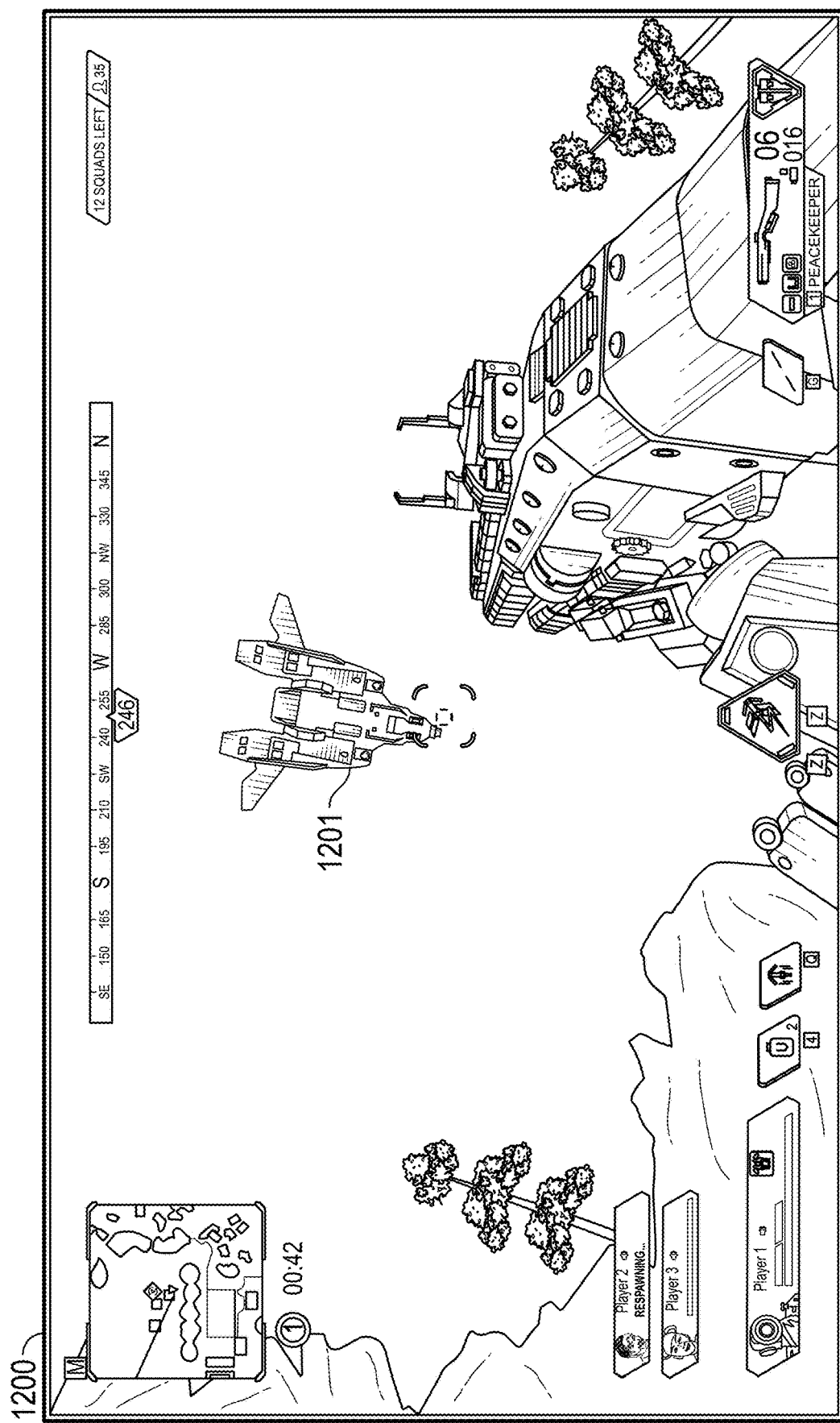
FIG. 12A shows an example illustrated screenshot of the first player's field of view when the second player is being prepared for respawn at the respawn location.

FIG. 12A shows an example illustrated screenshot 1200 from the first player's first-person perspective looking at a dropship 1201 returning the second player's character to the virtual environment as part of respawning the second player. The dropship 1201 can bring the second player's character to the respawn location where a teammate used the respawn activation item to respawn the second player's character. As the dropship 1201 flies over the virtual environment to the respawn location, other teams and/or non-player characters can see the dropship as it approaches the respawn location.

In other examples, the second player's character can be made to appear at or within a threshold distance of the respawn location in the virtual environment using any variety of video game mechanics. For example, the second player's character can be flown, teleported, transported, moved, and the like to the respawn location. The second player's character can magically appear, be raised, resurrected, recreated, regenerated, and the like at the respawn the location.

Figure 12B:
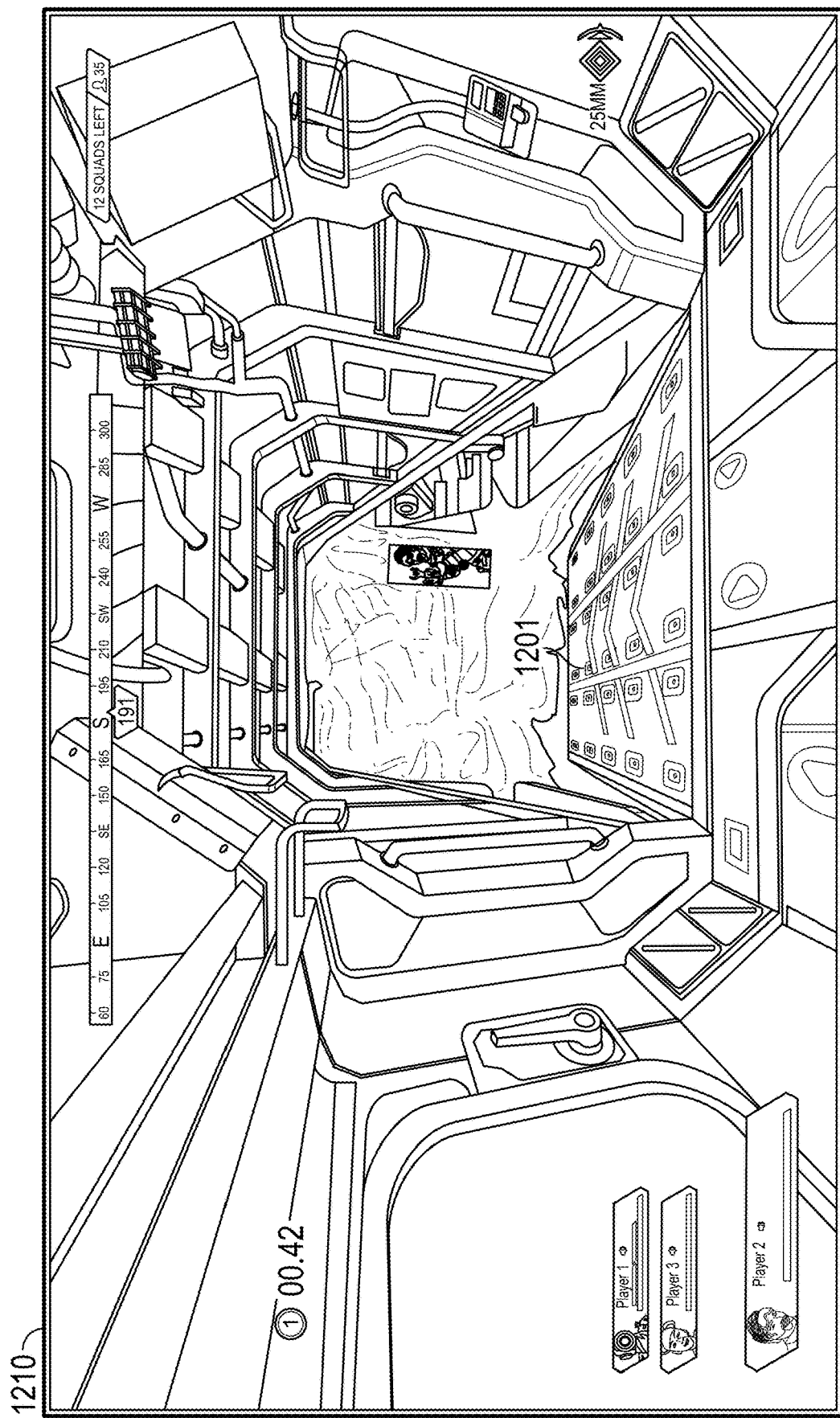
FIG. 12B shows an example illustrated screenshot of the second player's field of view when the second player is respawned at the respawn location.

FIG. 12B shows an example illustrated screenshot 1210 of the same game state as screenshot 1200 from the second player's first-person perspective. The illustration 1210 is the second player's view of the interior of the dropship 1201. The second player's character is respawned in the normal state in the dropship above the respawn location. The second player's character can exit the dropship and land at or near the respawn location.

Figure 13A:
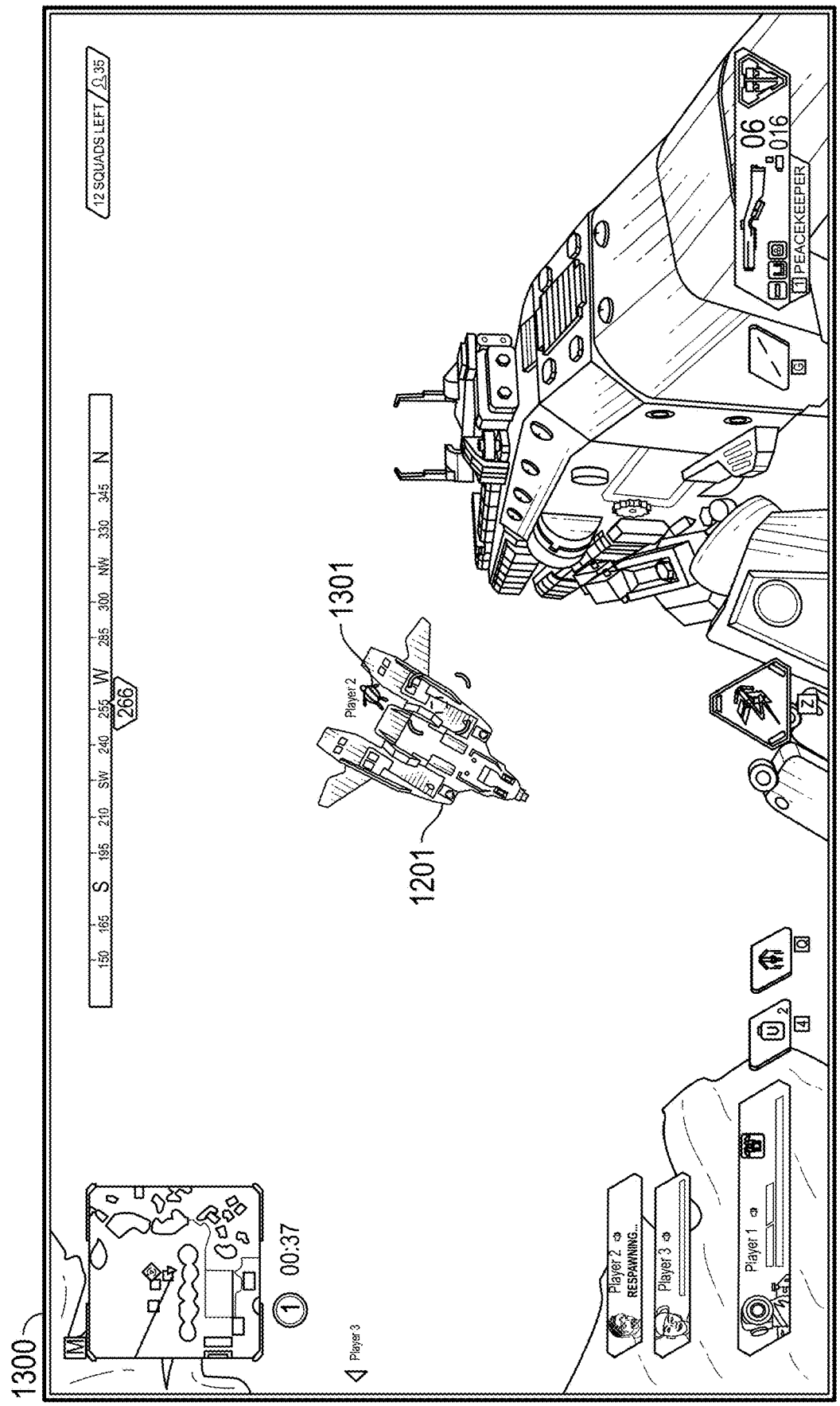
FIG. 13A shows an example illustrated screenshot of the first player's field of view when the second player's character has respawned and left the dropship at the respawn location.

FIG. 13A shows an example illustrated screenshot 1300 from the first player's first-person perspective as the second character 1301 exits the dropship 1201 in the normal state. While the second character 1301 exits the dropship to land below, the second character 1301 is vulnerable to damage. When respawned, the second character 1301 can have an empty inventory. In some cases, a teammate who collected inventory items from the inventory container of the second character can give those inventory items back to the second character.

Figure 13B:
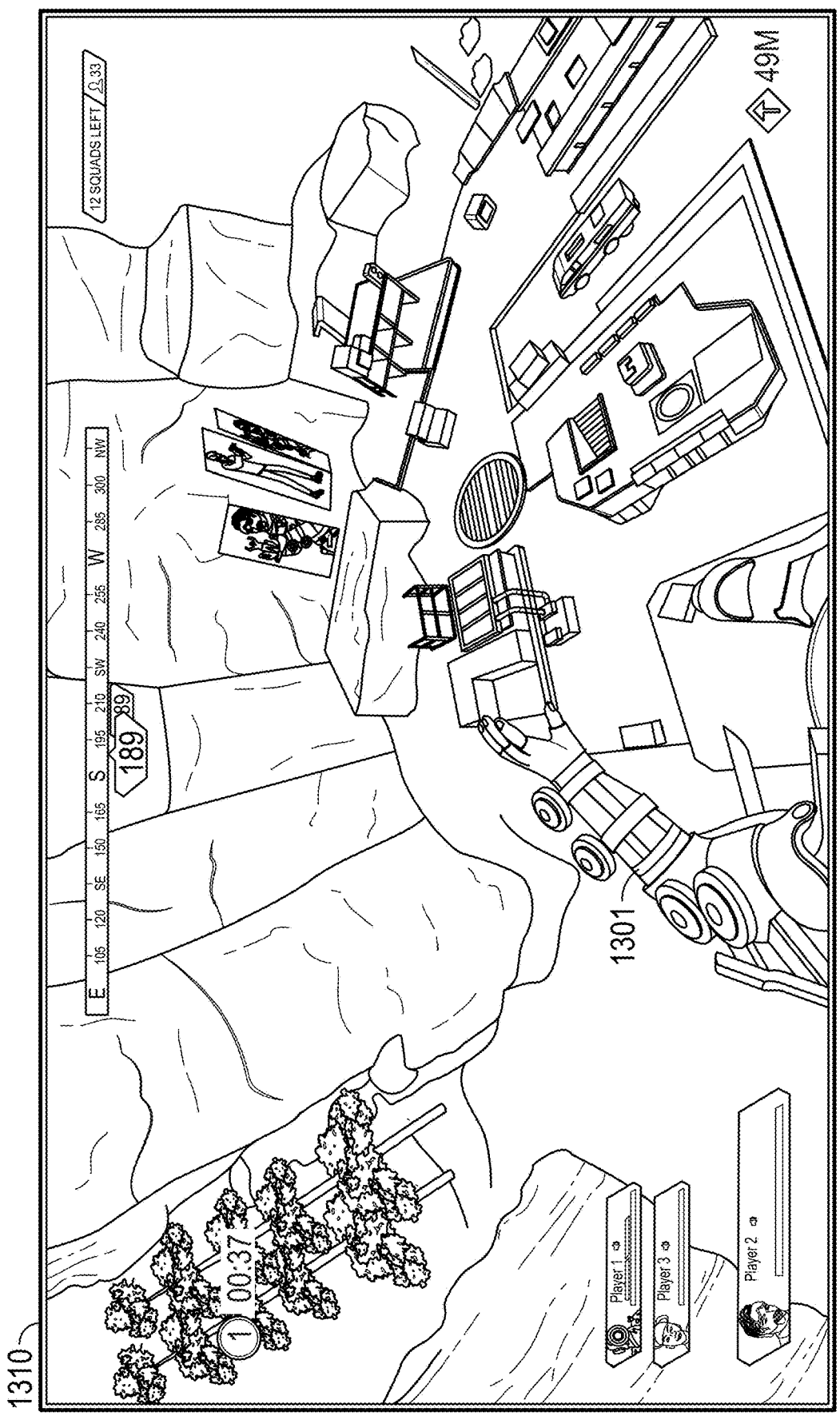
FIG. 13B shows an example illustrated screenshot of the second player's field of view when the second player's character has respawned and left the dropship at the respawn location.

FIG. 13B shows an example illustrated screenshot 1310 of the same game state as illustration 1300 from the second player's first-person perspective. The second character 1301 is jumping out and exiting the dropship above the respawn location. After landing, the second player can resume gameplay and control a character close to at least one teammate who used the respawn activation item at the respawn location.

Figure 14:
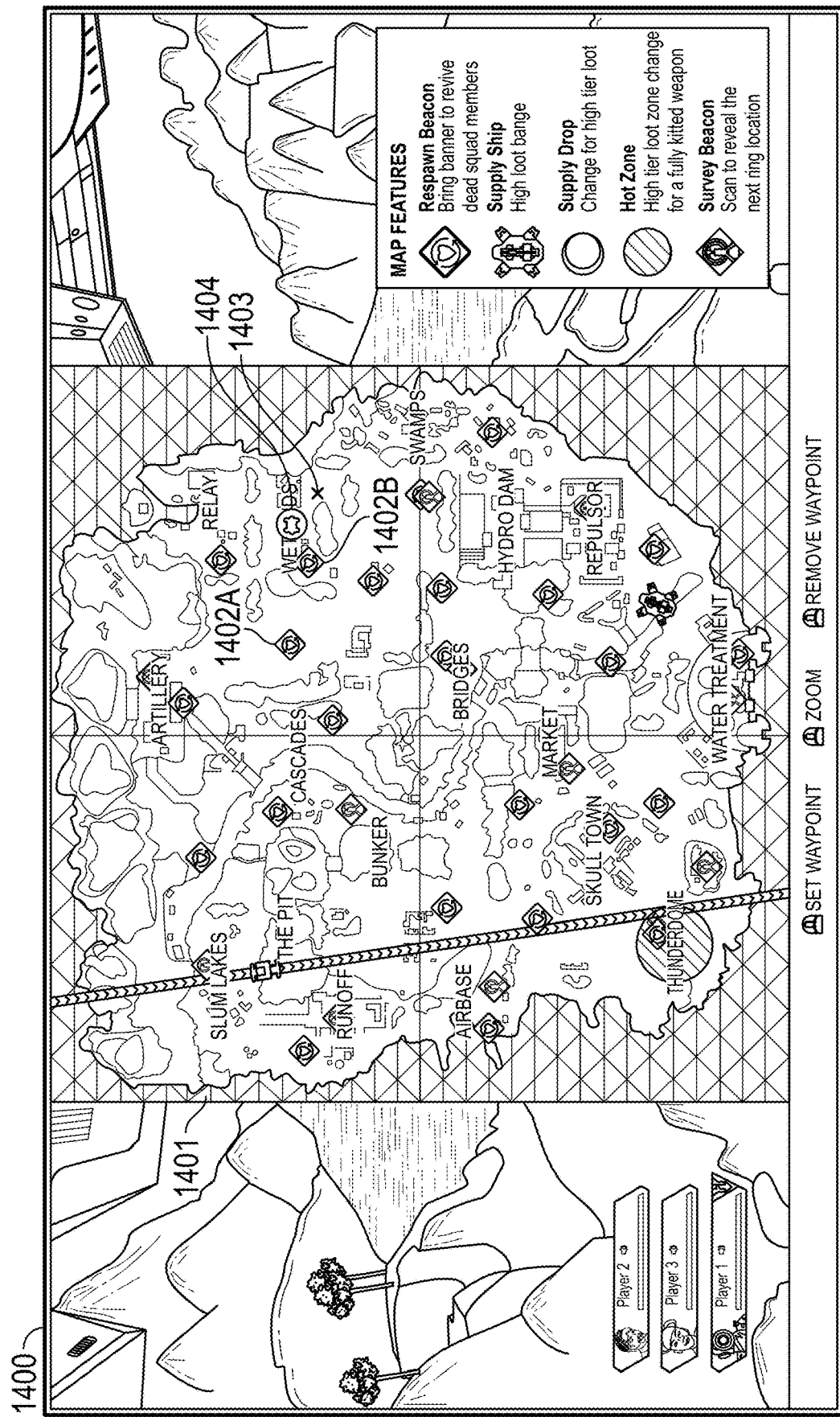
FIG. 14 shows an example map of a virtual environment in a video game.

FIG. 14 shows an example map 1401 of a virtual environment in the game. The map 1401 includes a plurality of respawn beacon map icons such as 1402A and 1402B, a first location icon 1403 where the second character was preliminarily defeated, and a dropship icon 1404 where the second character is being respawned. The respawn beacon map icons mark the respawn locations where the respawn beacons are located. In some implementations, the respawn locations can be the same across multiple rounds of the same game. In some implementations, the respawn locations can be in different or randomized locations in different games. In some implementations, the map 1401 can distinguish between active respawn locations and inactive respawn locations where players can no longer have their characters respawned. In some implementations, the respawn locations and/or respawn activation beacons can be located in fixed locations in a virtual environment that are set as part of generating the virtual environment. In some implementations, the respawn locations and/or respawn activation beacons can dynamically move or change during gameplay. In various implementations, the respawn locations can be statically placed as part of the virtual environment or dynamically move or change locations in the virtual environment.

Overview of Computing Device

Figure 15:
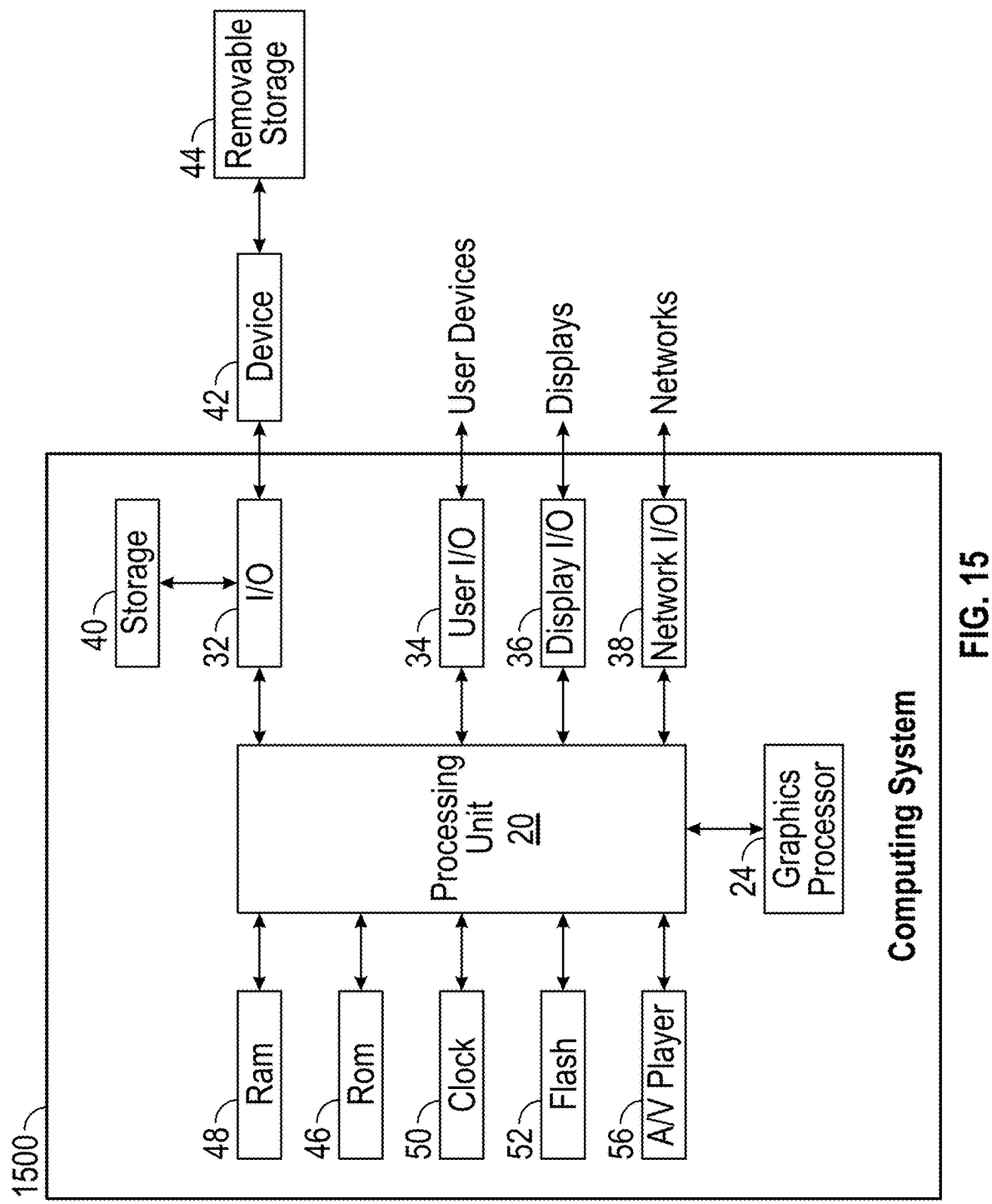
FIG. 15 illustrates an example of a computing system according to the present disclosure.

FIG. 15 illustrates an example of a computing system 1500 according to the present disclosure. Other variations of the computing system 1500 may be substituted for the examples explicitly presented herein, such as removing or adding components to the computing environment 100. The computing system 1500 may include a game device, a smart phone, a tablet, a personal computer, a laptop, a smart television, a car console display, a server, and the like. As shown, the computing system 1500 includes a processing unit 20 that interacts with other components of the computing system 1500 and also external components to computing system 1500. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing system 1500 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing system 1500 may include a discrete graphics processor 24 that is separate from the processing unit 20. In some such cases, the graphics processor 24 may have separate RAM from the processing unit 20. Computing system 1500 might be a handheld video game device, a dedicated game console computing system, a general-purpose laptop or desktop computer, a smart phone, a tablet, a car console, or other suitable system.

Computing system 1500 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing system 1500. Processing unit 20 can communicate through I/O 32 to store data, such as game state data and any shared data files. In addition to storage 40 and removable storage media 44, computing system 1500 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some examples, the user I/O can include a touchscreen inputs. The touchscreen can be capacitive touchscreen, a resistive touchscreen, or other type of touchscreen technology that is configured to receive user inputs through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by computing system 1500 on a display device, such as graphics, user interfaces, video, and/or other visual content. Computing system 1500 may comprise one or more integrated displays configured to receive display output signals produced by display I/O 36. According to some examples, display output signals produced by display I/O 36 may also be output to one or more display devices external to computing system 1500.

The computing system 1500 can also include other features that may be used with a game, such as a clock 50, flash memory 52, and other components. An audio/video player 56 might also be used to play a video sequence, such as a movie. It should be understood that other components may be provided in computing system 1500 and that a person skilled in the art will appreciate other variations of computing system 1500.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user inputs and generating display outputs. Generally, RAM 48 is volatile storage and data stored within RAM 48 may be lost when the computing system 1500 is turned off or loses power.

As computing system 1500 reads media 12 and provides an application, information may be read from game media 12 and stored in a memory device, such as RAM 48. Additionally, data from storage 40, ROM 46, servers accessed via a network (not shown), or removable storage media 44 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular example described herein. Thus, for example, those skilled in the art will recognize that certain examples may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, certain acts, events, or functions of any of the algorithms described herein can be performed in a different sequence, can be added, merged, or left out altogether (for example, not all described acts or events are necessary for the practice of the algorithms). Moreover, in certain examples, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another example, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described examples, the elements of which are to be understood as being among other acceptable examples. All such modifications and variations are intended to be included herein within the scope of this disclosure.

What is claimed is:

1. A method, implemented by one or more processors, comprising:
executing a multiplayer gameplay session of a video game application where multiple players control in-game characters interacting within a virtual environment;
changing a first character from a normal state to a preliminarily defeated state at a first location in the virtual environment, wherein the first character is controlled by first user inputs provided by a first player on a first team;
generating a respawn activation item for the first character;
receiving second user inputs from a second player on the first team controlling a second character to acquire the respawn activation item;
receiving third user inputs causing a member of the first team to use the respawn activation item at a respawn location different from the first location; and
in response to using the respawn activation item at the respawn location, respawning the first character at the respawn location in the normal state.

2. The method of claim 1, further comprising:
restricting the first character to an incapacitated state before the first character is in the preliminarily defeated state, wherein while the first character is in the incapacitated state, the first character is restricted from at least one of:
using an inventory item otherwise available to the first character while the first character is in the normal state; or
performing an action or movement otherwise available to the first character while the first character is in the normal state.

3. The method of claim 2, further comprising:
changing the first character from the incapacitated state to the preliminarily defeated state in response to at least one of:
the first character remaining in the incapacitated state for a threshold quantity of elapsed time without recovering to the normal state; or
the first character receiving a defined amount of damage.

4. The method of claim 1, wherein the third user inputs are received from a third player on the first team.

5. The method of claim 1, further comprising:
in response to the preliminarily defeated state of the first character, generating an inventory container for the first character, wherein the inventory container includes inventory items of the first character; and
receiving fourth user inputs from the second player controlling the second character to interact with the inventory container to acquire one or more of the inventory items;
wherein the second user inputs from the second player control the second character to interact with the inventory container to acquire the respawn activation item.

6. The method of claim 1, wherein the first character is respawned at the respawn location without inventory items.

7. The method of claim 1, further comprising:
starting an elimination timer in response to the first character being preliminarily defeated, wherein an elimination of the first character is determined based at least in part on the elimination timer.

8. A non-transitory, computer readable medium storing computer-executable instructions configured to be executed by one or more processors to perform operations comprising:
executing an instance of a multiplayer video game session where in-game characters interact in a virtual environment;
changing a first character from a normal state to a preliminarily defeated state at a first location in the virtual environment, wherein the first character is controlled by first user inputs provided by a first player on a first team;
generating a respawn activation item for the first character;
receiving second user inputs from a second player on the first team controlling a second character to acquire the respawn activation item;
receiving third user inputs from any member of the first team causing any character to use the respawn activation item at a respawn location different from the first location; and
in response to using the respawn activation item at the respawn location, respawning the first character at the respawn location.

9. The computer readable medium of claim 8, the operations further comprising:
restricting the first character to an incapacitated state before the first character is in the preliminarily defeated state, wherein while the first character is in the incapacitated state, the first character is restricted from at least one of:
using an inventory item otherwise available to the first character while the first character is in the normal state; or
performing an action or movement otherwise available to the first character while the first character is in the normal state.

10. The computer readable medium of claim 9, the operations further comprising:
changing the first character from the incapacitated state to the preliminarily defeated state at least one of:
the first character remaining in the incapacitated state for a threshold quantity of elapsed time without recovering to the normal state; or
the first character receiving a defined amount of damage.

11. The computer readable medium of claim 8, wherein the third user inputs are received from a third player on the first team.

12. The computer readable medium of claim 8, the operations further comprising:
in response to the preliminarily defeated state of the first character, generating an inventory container for the first character, wherein the inventory container includes inventory items of the first character; and
receiving fourth user inputs from the second player controlling the second character to interact with the inventory container to acquire one or more of the inventory items;
wherein the second user inputs from the second player on the first team control the second character to interact with the inventory container to acquire the respawn activation item.

13. The computer readable medium of claim 8, wherein the first character is respawned at the respawn location without inventory items.

14. The computer readable medium of claim 8, the operations further comprising:
    starting an elimination timer in response to the first character being preliminarily defeated, wherein an elimination of the first character is determined based at least in part on the elimination timer.

15. A computer system comprising:
    one or more data stores storing computer-executable instructions; and
    one or more processors configured to execute the computer executable instructions in order to perform operations comprising:
        executing an instance of a multiplayer video game session where in-game characters interact in a virtual environment;
        changing a first character from a normal state to a preliminarily defeated state at a first location in the virtual environment, wherein the first character is controlled by first user inputs provided by a first player on a first team;
        generating a respawn activation item for the first character;
        receiving second user inputs from a second player on the first team controlling a second character to acquire the respawn activation item;
        receiving third user inputs from any member of the first team causing any character to use the respawn activation item at a respawn location different from the first location; and
        in response to using the respawn activation item at the respawn location, respawning the first character at the respawn location.

16. The computer system of claim 15, the operations further comprising:
    restricting the first character to an incapacitated state before the first character is in the preliminarily defeated state, wherein while the first character is in the incapacitated state, the first character is restricted from at least one of:
        using an inventory item otherwise available to the first character while the first character is in the normal state; or
        performing an action or movement otherwise available to the first character while the first character is in the normal state.

17. The computer system of claim 16, the operations further comprising:
    changing the first character from the incapacitated state to the preliminarily defeated state at least one of:
        the first character remaining in the incapacitated state for a threshold quantity of elapsed time without recovering to the normal state; or
        the first character receiving a defined amount of damage.

18. The computer system of claim 15, wherein the third user inputs are received from a third player on the first team.

19. The computer system of claim 15, the operations further comprising:
    in response to the preliminarily defeated state of the first character, generating an inventory container for the first character, wherein the inventory container includes inventory items of the first character; and
    receiving fourth user inputs from the second player controlling the second character to interact with the inventory container to acquire one or more of the inventory items;
    wherein the second user inputs from the second player control the second character to interact with the inventory container to acquire the respawn activation item.

20. The computer system of claim 15, wherein the first character is respawned at the respawn location without inventory items.

* * * * *